US012572948B2

(12) United States Patent
Lee et al.

(10) Patent No.:  US 12,572,948 B2
(45) Date of Patent:      Mar. 10, 2026

(54) PREDICTIVE MAINTENANCE SYSTEM FOR BUILDING EQUIPMENT WITH RELIABILITY MODELING BASED ON NATURAL LANGUAGE PROCESSING OF WARRANTY CLAIM DATA

(71) Applicant: Tyco Fire & Security GmbH, Neuhausen am Rheinfall (CH)

(72) Inventors: Young M. Lee, Old Westbury, NY (US); Wenwen Zhao, Santa Clara, CA (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 193 days.

(21) Appl. No.: 17/971,342

(22) Filed: Oct. 21, 2022

(65) Prior Publication Data

US 2024/0185257 A1      Jun. 6, 2024

(51) Int. Cl.
*G06Q 30/00*       (2023.01)
*G06F 40/279*      (2020.01)
*G06Q 30/012*      (2023.01)

(52) U.S. Cl.
CPC ......... *G06Q 30/012* (2013.01); *G06F 40/279* (2020.01)

(58) Field of Classification Search
None
See application file for complete search history.

(56) References Cited

U.S. PATENT DOCUMENTS

| | | | |
|---|---|---|---|
| 10,607,084 B1 * | 3/2020 | Tang | G06T 7/70 |
| 11,430,069 B1 * | 8/2022 | Pedersen | G06V 20/176 |
| 2010/0306143 A1 * | 12/2010 | de Mello Filho | G06F 40/284 |
| | | | 706/15 |
| 2014/0142989 A1 * | 5/2014 | Grosso | G06Q 40/00 |
| | | | 705/4 |
| 2016/0378435 A1 * | 12/2016 | Danielson | G06F 8/20 |
| | | | 717/104 |
| 2017/0109945 A1 * | 4/2017 | Hague | H04B 7/2606 |
| 2017/0351830 A1 * | 12/2017 | Burger | G16H 80/00 |
| 2018/0341255 A1 | 11/2018 | Turney et al. | |
| 2018/0359597 A1 * | 12/2018 | Lazar | H04W 4/50 |

(Continued)

FOREIGN PATENT DOCUMENTS

| | | |
|---|---|---|
| WO | WO-2019/221850 A2 | 11/2019 |
| WO | WO-2022/120158 A1 | 6/2022 |

OTHER PUBLICATIONS

Lawless, Jerald F., M. J. Crowder, and K-A. Lee. "Analysis of reliability and warranty claims in products with age and usage scales." Technometrics 51.1 (2009): 14-24. (Year: 2009).*

(Continued)

*Primary Examiner* — Luis A Brown

(74) *Attorney, Agent, or Firm* — Foley & Lardner LLP

(57) ABSTRACT

A method for generating a training data set includes receiving, by a processing circuit, warranty claim data associated with one or more building devices or building device components; processing, by the processing circuit, the warranty claim data using natural language processing to generate a training data set comprising one or more causes and solutions associated with failure of the one or more building devices or the building device components; and training, by the processing circuit, a component reliability model using the training data set to produce a trained model.

20 Claims, 16 Drawing Sheets

(56)         References Cited

U.S. PATENT DOCUMENTS

| | | | |
|---|---|---|---|
| 2019/0121849 A1* | 4/2019 | Taraba | G06F 40/284 |
| 2019/0132145 A1* | 5/2019 | O'Hora | H04L 12/2818 |
| 2019/0383510 A1 | 12/2019 | Murugesan et al. | |
| 2019/0384239 A1 | 12/2019 | Murugesan et al. | |
| 2019/0385070 A1 | 12/2019 | Lee et al. | |
| 2020/0011784 A1* | 1/2020 | Chalumuri | G06Q 10/20 |
| 2020/0034574 A1* | 1/2020 | Baltes | G06F 21/606 |
| 2020/0151246 A1* | 5/2020 | Mwarabu | G06F 40/216 |
| 2020/0249920 A1 | 8/2020 | Sharma et al. | |
| 2020/0285988 A1* | 9/2020 | Saha | G05B 23/0283 |
| 2021/0056452 A1 | 2/2021 | Murugesan et al. | |
| 2021/0157562 A1* | 5/2021 | Sethi | G06F 9/453 |
| 2021/0190354 A1* | 6/2021 | Llopis | F24F 11/49 |
| 2021/0190364 A1 | 6/2021 | Lee et al. | |
| 2021/0191342 A1 | 6/2021 | Lee et al. | |
| 2021/0191343 A1 | 6/2021 | Lee et al. | |
| 2021/0191348 A1* | 6/2021 | Lee | G05B 13/047 |
| 2021/0232369 A1 | 7/2021 | Sharma et al. | |
| 2021/0312351 A1* | 10/2021 | Pourmohammad | G06F 16/906 |
| 2022/0026879 A1* | 1/2022 | Kale | G05B 19/4155 |
| 2022/0215167 A1* | 7/2022 | Rajpathak | G06N 3/047 |
| 2023/0123527 A1* | 4/2023 | Michael | G06N 3/084 |
| | | | 702/183 |
| 2023/0153766 A1* | 5/2023 | Thoele | G06Q 40/08 |
| | | | 705/4 |
| 2023/0205849 A1* | 6/2023 | Jackson | G06F 21/10 |
| | | | 726/26 |
| 2024/0003948 A1* | 1/2024 | Mourrier | G01R 27/08 |
| 2024/0098660 A1* | 3/2024 | Maruyama | H04W 56/0015 |
| 2024/0193615 A1* | 6/2024 | Swaroop | G06Q 30/012 |

OTHER PUBLICATIONS

Wu, Shaomin. "Warranty data analysis: A review." Quality and Reliability Engineering International 28.8 (2012): 795-805. (Year: 2012).*

Aksezer, Caglar S. "Failure analysis and warranty modeling of used cars." Engineering failure analysis 18.6 (2011): 1520-1526. (Year: 2011).*

Lawless, Jerald F. "Statistical analysis of product warranty data." International Statistical Review 66.1 (1998): 41-60. (Year: 1998).*

Shahanaghi, Kamran, et al. "Failure modeling and optimizing preventive maintenance strategy during two-dimensional extended warranty contracts." Engineering Failure Analysis 28 (2013): 90-102. (Year: 2013).*

Wifvat, Kathryn, John Kumerow, and Arkady Shemyakin. "Copula model selection for vehicle component failures based on warranty claims." Risks 8.2 (2020): 56. (Year: 2020).*

U.S. Appl. No. 17/530,257, filed Nov. 18, 2021, Johnson Controls Tyco IP Holdings LLP.

U.S. Appl. No. 17/539,757, filed Dec. 1, 2021, Johnson Controls Tyco IP Holdings LLP.

U.S. Appl. No. 17/710,603, filed May 9, 2022, Johnson Controls Tyco IP Holdings LLP.

U.S. Appl. No. 17/827,439, filed May 27, 2022, Johnson Controls Tyco IP Holdings LLP.

U.S. Appl. No. 17/965,345, filed Oct. 13, 2022, Johnson Controls Tyco IP Holdings LLP.

* cited by examiner

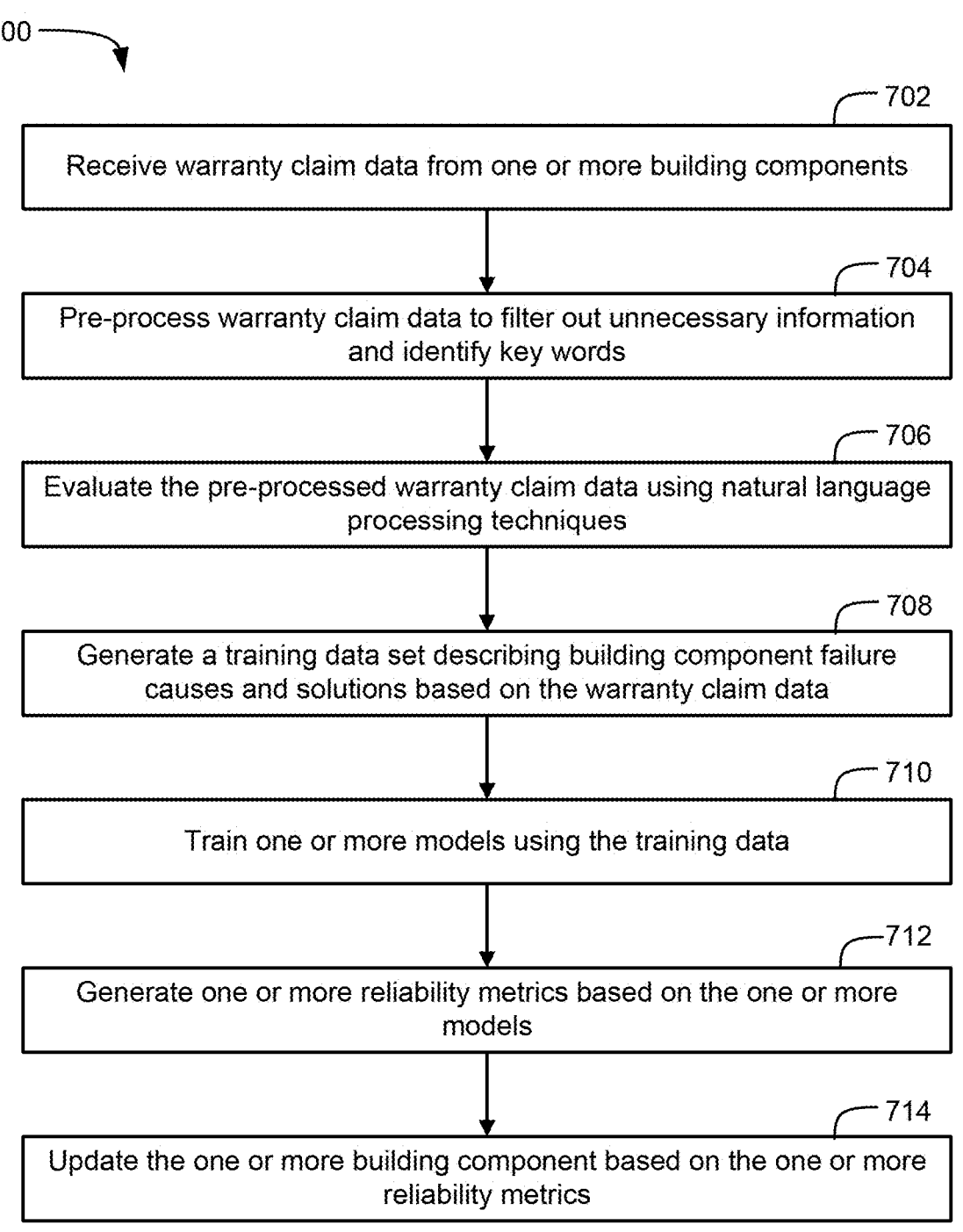

700

702
Receive warranty claim data from one or more building components

704
Pre-process warranty claim data to filter out unnecessary information and identify key words 706
Evaluate the pre-processed warranty claim data using natural language processing techniques 708
Generate a training data set describing building component failure causes and solutions based on the warranty claim data 710
Train one or more models using the training data 712
Generate one or more reliability metrics based on the one or more models 714
Update the one or more building component based on the one or more reliability metrics

| Chiller Type | Number of components | Number of claims |
|:---:|:---:|:---:|
| YLAA | 89 | 16381 |
| YVAA | 94 | 20122 |
| YCAL | 49 | 2695 |
| YVFA | 36 | 609 |
| YCWL | 53 | 1399 |
| YSAA | 5 | 49 |
| YVWA | 48 | 1636 |
| YCAV | 69 | 8262 |
| YMC | 141 | 8771 |
| YK | 194 | 20306 |
| YD | 71 | 666 |
| YST | 83 | 563 |
| YS | 38 | 224 |
| YR | 32 | 200 |
| YK-EP | 42 | 167 |
| YCUL | 36 | 1159 |
| AIR | 20 | 155 |
| YIA | 78 | 593 |
| YPC | 65 | 589 |
| YZ | 29 | 370 |
| CODEKITS | 5 | 8 |
| YG | 2 | 7 |

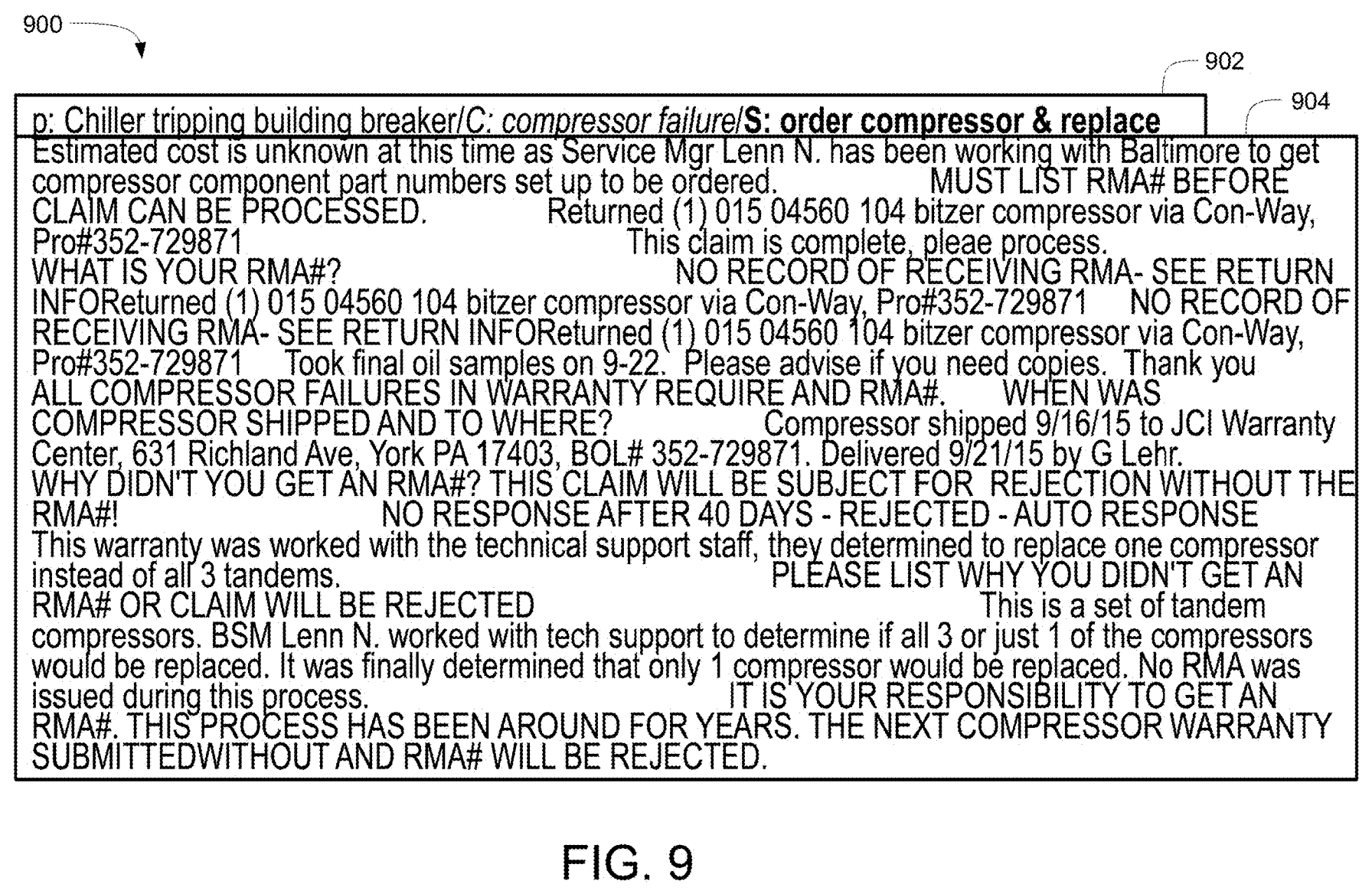

900

904

902 p: Chiller tripping building breaker/C: compressor failure/S: order compressor & replace

Estimated cost is unknown at this time as Service Mgr Lenn N. has been working with Baltimore to get compressor component part numbers set up to be ordered.     MUST LIST RMA# BEFORE CLAIM CAN BE PROCESSED.

Returned (1) 015 04560 104 bitzer compressor via Con-Way, Pro#352-729871

WHAT IS YOUR RMA?

This claim is complete, pleae process.

NO RECORD OF RECEIVING RMA- SEE RETURN INFOReturned (1) 015 04560 104 bitzer compressor via Con-Way, Pro#352-729871     NO RECORD OF RECEIVING RMA- SEE RETURN INFOReturned (1) 015 04560 104 bitzer compressor via Con-Way, Pro#352-729871     Took final oil samples on 9-22. Please advise if you need copies. Thank you ALL COMPRESSOR FAILURES IN WARRANTY REQUIRE AND RMA#.     WHEN WAS COMPRESSOR SHIPPED AND TO WHERE?

Compressor shipped 9/16/15 to JCI Warranty Center, 631 Richland Ave, York PA 17403, BOL# 352-729871. Delivered 9/21/15 by G.Lehr.

WHY DIDN'T YOU GET AN RMA#? THIS CLAIM WILL BE SUBJECT FOR REJECTION WITHOUT THE RMA#!

NO RESPONSE AFTER 40 DAYS - REJECTED - AUTO RESPONSE

This warranty was worked with the technical support staff, they determined to replace one compressor instead of all 3 tandems.     This is a set of tandem compressors. BSM Lenn N. worked with tech support to determine if all 3 or just 1 of the compressors would be replaced. It was finally determined that only 1 compressor would be replaced. No RMA was issued during this process.     PLEASE LIST WHY YOU DIDN'T GET AN RMA# OR CLAIM WILL BE REJECTED     IT IS YOUR RESPONSIBILITY TO GET AN RMA#. THIS PROCESS HAS BEEN AROUND FOR YEARS. THE NEXT COMPRESSOR WARRANTY SUBMITTEDWITHOUT AND RMA# WILL BE REJECTED.

FIG. 9

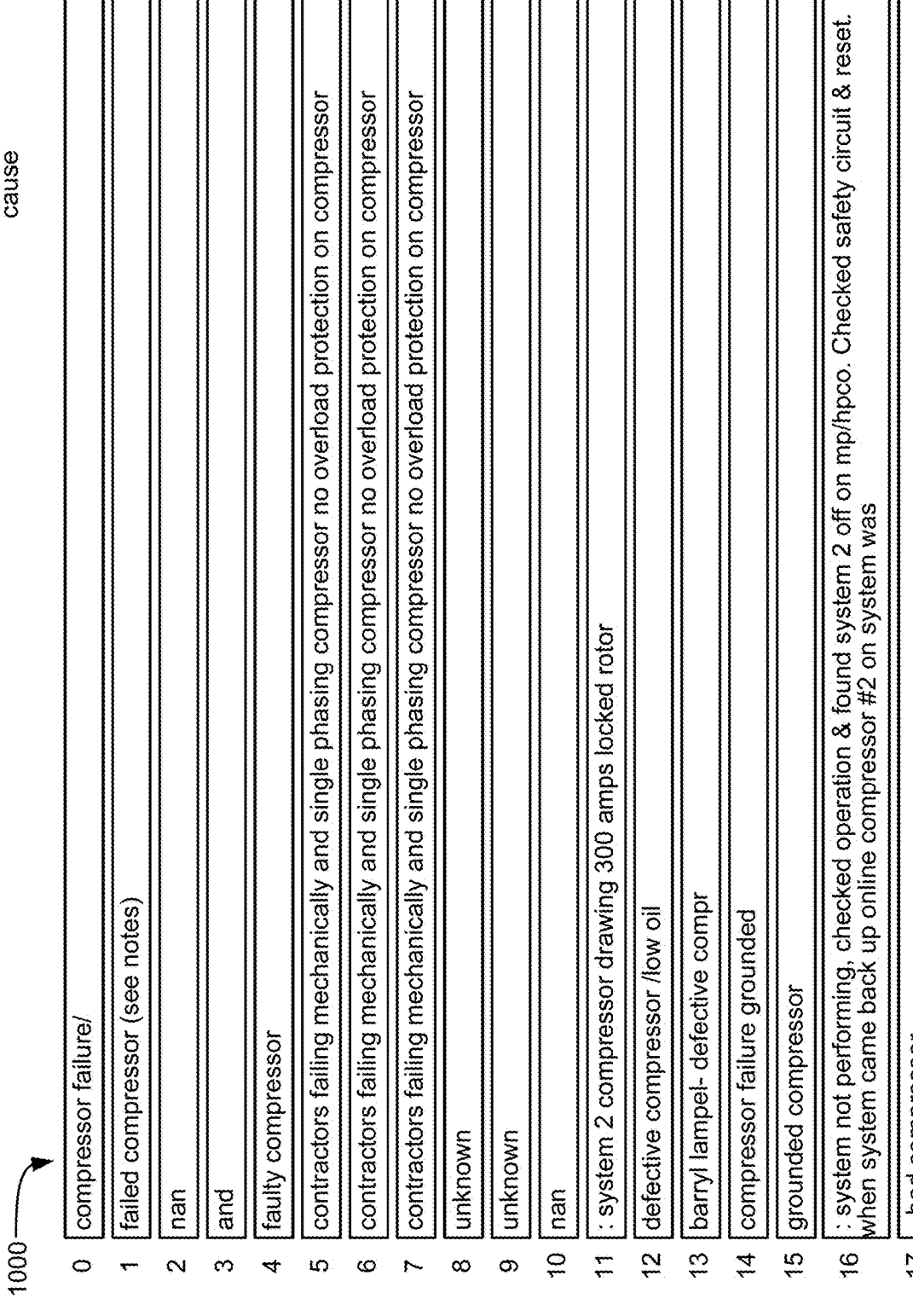

| | cause |
|---|---|
| 0 | compressor failure/ |
| 1 | failed compressor (see notes) |
| 2 | nan |
| 3 | and |
| 4 | faulty compressor |
| 5 | contractors failing mechanically and single phasing compressor no overload protection on compressor |
| 6 | contractors failing mechanically and single phasing compressor no overload protection on compressor |
| 7 | contractors failing mechanically and single phasing compressor no overload protection on compressor |
| 8 | unknown |
| 9 | unknown |
| 10 | nan |
| 11 | : system 2 compressor drawing 300 amps locked rotor |
| 12 | defective compressor /low oil |
| 13 | barryl lampel- defective compr |
| 14 | compressor failure grounded |
| 15 | grounded compressor |
| 16 | : system not performing, checked operation & found system 2 off on mp/hpco. Checked safety circuit & reset. when system came back up online compressor #2 on system was |
| 17 | - bad compressor |

FIG. 10A

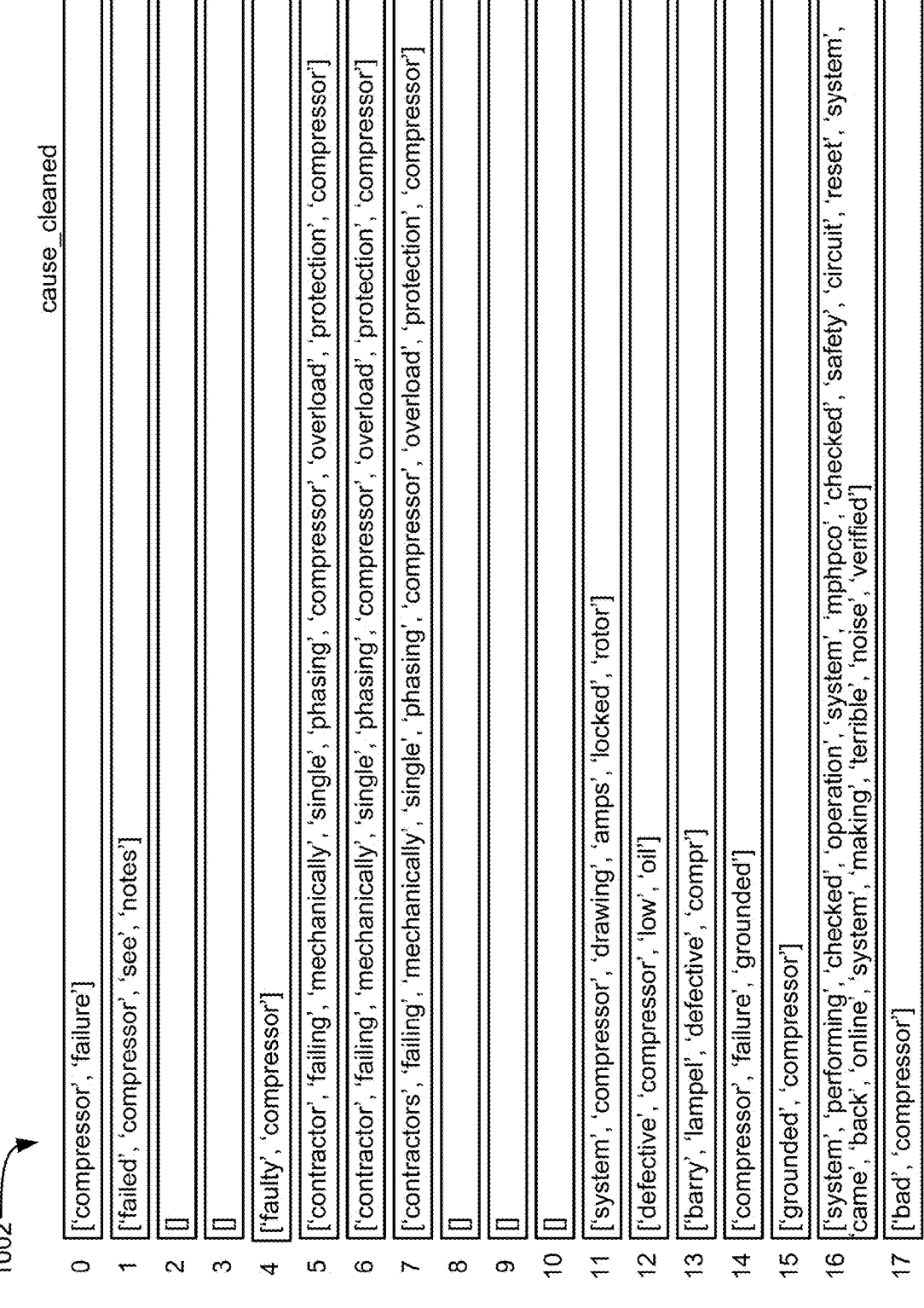

| | cause_cleaned |
|---|---|
| 0 | ['compressor', 'failure'] |
| 1 | ['failed', 'compressor', 'see', 'notes'] |
| 2 | [] |
| 3 | [] |
| 4 | ['faulty', 'compressor'] |
| 5 | ['contractor', 'failing', 'mechanically', 'single', 'phasing', 'compressor', 'overload', 'protection', 'compressor'] |
| 6 | ['contractor', 'failing', 'mechanically', 'single', 'phasing', 'compressor', 'overload', 'protection', 'compressor'] |
| 7 | ['contractors', 'failing', 'mechanically', 'single', 'phasing', 'compressor', 'overload', 'protection', 'compressor'] |
| 8 | [] |
| 9 | [] |
| 10 | [] |
| 11 | ['system', 'compressor', 'drawing', 'amps', 'locked', 'rotor'] |
| 12 | ['defective', 'compressor', 'low', 'oil'] |
| 13 | ['barry', 'lampel', 'defective', 'compr'] |
| 14 | ['compressor', 'failure', 'grounded'] |
| 15 | ['grounded', 'compressor'] |
| 16 | ['system', 'performing', 'checked', 'operation', 'system', 'mphpco', 'checked', 'safety', 'circuit', 'reset', 'system', 'came', 'back', 'online', 'system', 'making', 'terrible', 'noise', 'verified'] |
| 17 | ['bad', 'compressor'] |

Figure 10C:
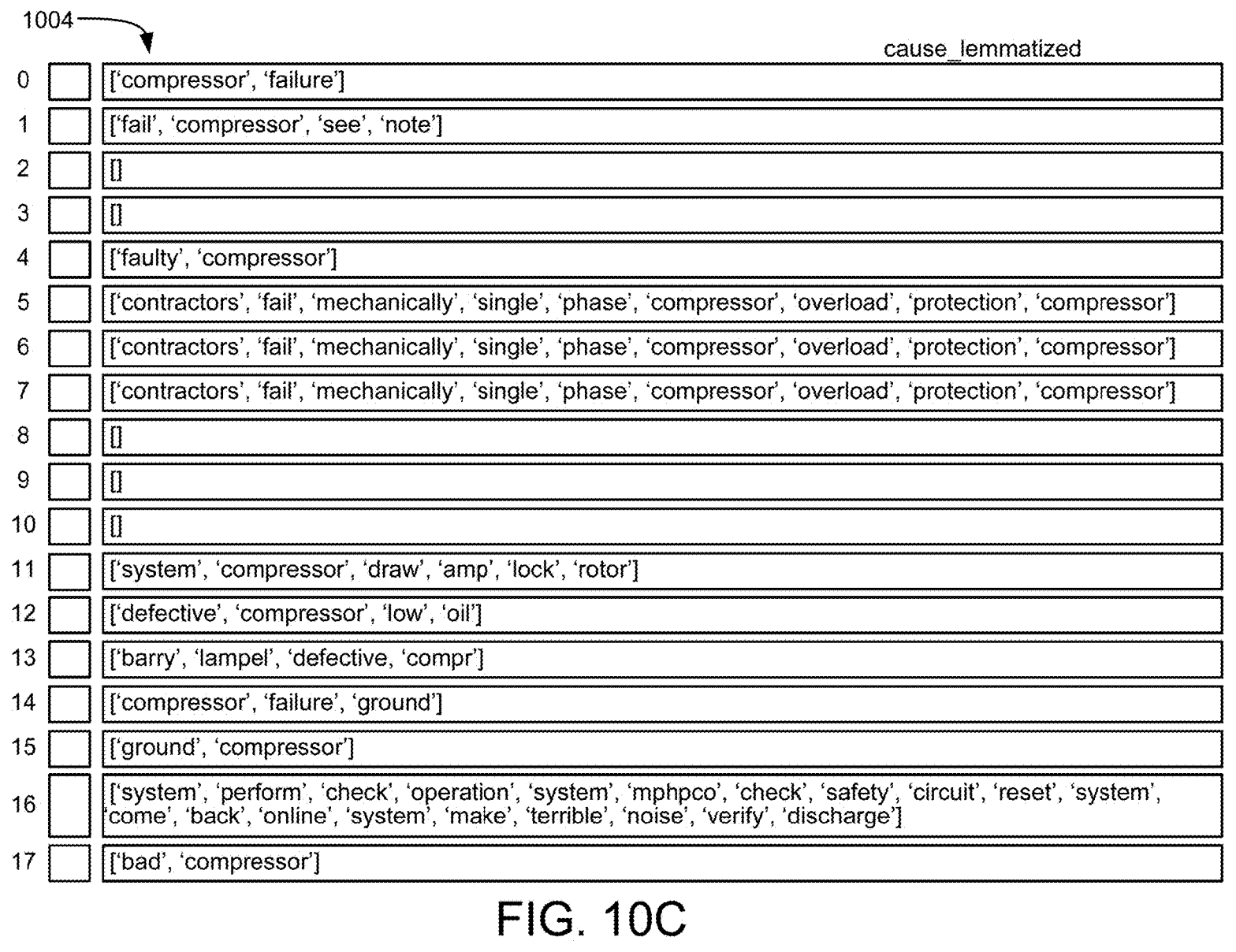

| | cause_lemmatized |
|---|---|
| 0 | ['compressor', 'failure'] |
| 1 | ['fail', 'compressor', 'see', 'note'] |
| 2 | [] |
| 3 | [] |
| 4 | ['faulty', 'compressor'] |
| 5 | ['contractors', 'fail', 'mechanically', 'single', 'phase', 'compressor', 'overload', 'protection', 'compressor'] |
| 6 | ['contractors', 'fail', 'mechanically', 'single', 'phase', 'compressor', 'overload', 'protection', 'compressor'] |
| 7 | ['contractors', 'fail', 'mechanically', 'single', 'phase', 'compressor', 'overload', 'protection', 'compressor'] |
| 8 | [] |
| 9 | [] |
| 10 | [] |
| 11 | ['system', 'compressor', 'draw', 'amp', 'lock', 'rotor'] |
| 12 | ['defective', 'compressor', 'low', 'oil'] |
| 13 | ['barry', 'lampel', 'defective', 'compr'] |
| 14 | ['compressor', 'failure', 'ground'] |
| 15 | ['ground', 'compressor'] |
| 16 | ['system', 'perform', 'check', 'operation', 'system', 'mphpco', 'check', 'safety', 'circuit', 'reset', 'system', 'come', 'back', 'online', 'system', 'make', 'terrible', 'noise', 'verify', 'discharge'] |
| 17 | ['bad', 'compressor'] |

| index | causes | solutions |
|---|---|---|
| 1 | defective oil cooler | replace oil cooler |
| 2 | bad actuator motor | replace actuator motor |
| 3 | faulty motor monitor board | replace motor monitor board |
| 4 | harmonic filter logic board | replace filter logic board |
| 5 | defective logic board | replace logic board |
| 6 | defective pressure transducer | replace pressure transducer |
| 7 | low refrigerant factory | gauge refrigerant side |
| 8 | loose wire connection | check wire connection |
| 9 | old software version | update software latest |
| 10 | defective water flow | test water box |
| 11 | bad seal actuator | replace seal impeller |
| 12 | defective condenser pressure transducer | replace condenser pressure transducer |
| 13 | faulty control board | level control actuator |
| 14 | bad power supply | replace power supply |
| 15 | upstream switch gear | move switch board |
| 16 | faulty microboard production | replace microboard part |
| 17 | low liquid refrigerant | replace liquid line |
| 18 | defective cooler water flow | cooler replace |
| 19 | defective gasket valve | cover gasket bulb |
| 20 | faulty temperature switch | replace temperature control valve |
| 21 | defective vane motor | replace vane motor |

FIG. 13

PREDICTIVE MAINTENANCE SYSTEM FOR BUILDING EQUIPMENT WITH RELIABILITY MODELING BASED ON NATURAL LANGUAGE PROCESSING OF WARRANTY CLAIM DATA

BACKGROUND

The present disclosure relates generally to predicting faults or other anomalies for building components, such as heating, ventilation, and/or air conditioning (HVAC) components. In some implementations, the present disclosure relates more particularly to predicting building component (e.g., chiller) faults using models trained, for example, with machine learning (e.g., deep learning).

Chillers are often found in buildings and are components of HVAC systems. Chillers are subject to faults, which can cause unplanned shutdowns due to safety and other concerns. More specifically, chiller shutdowns may cause loss of efficiency, as well as damage to other expensive HVAC equipment during a shutdown. It is desirable to predict chiller shutdowns prior to shutdowns occurring.

Chiller faults are often unexpected and difficult to predict. Various factors may cause a chiller fault including overuse, required maintenance, safety concerns and environmental conditions, among other possible factors. With many factors capable of influencing sudden chiller faults, predicting future chiller failure is challenging.

SUMMARY

One implementation of the present disclosure is a method for generating a reliability model for building devices or building device components. The method includes receiving, by a processing circuit, warranty claim data associated with one or more building devices or building device components. The method includes processing, by the processing circuit, the warranty claim data using natural language processing to generate a training data set comprising one or more causes and solutions associated with failure of the one or more building devices or the building device components. The method includes training, by the processing circuit, a component reliability model using the training data set to produce a trained model.

In some embodiments, the warranty claim data includes a warranty claim comment. In some embodiments, processing the warranty claim data further includes at least one of identifying key words in the warranty claim comment, removing a stop word in the warranty claim comment, lemmatizing words in the warranty claim comment, and removing unnecessary words from the warranty claim comment.

In some embodiments, evaluating, the processed warranty claim data using the natural language processing includes identifying, by the processing circuit, a plurality of words which occur in the warranty claim data over a predetermined amount of time, determining, by the processing circuit, that the plurality of words are independent from each other, creating, by the processing circuit, a plurality of word clusters associated with each of the plurality of words that are independent from each other, and generating, by the processing circuit, a plurality of n-grams to the plurality of word clusters to determine the one or more causes and solutions associated with the failure of the one or more building devices or the building device components. In some embodiments, generating the training data set based on the one or more causes and solutions further comprises combining, by the processing circuit, the plurality of n-grams to form the training data set which describes a predetermined number of building component failure causes and solutions.

In some embodiments, the method further includes generating, by the processing circuit, a reliability metric describing a predicted failure time associated with the one or more building devices or the building device components based on the trained model, and updating, by the processing circuit, the building device components based on the reliability metric. In some embodiments, updating the building device components comprises automatically updating a software for the building device component. In some embodiments, training the component reliability model to produce the trained model includes determining a shape parameter and a scale parameter of a Weibull model. In some embodiments, processing the warranty claim data includes filtering out unnecessary information and identifying key words.

Another implementation of the present disclosure is one or more non-transitory computer-readable storage mediums having instructions stored thereon that, when executed by one or more processors, cause the one or more processors to receive warranty claim data associated with one or more building devices or building device components, process the warranty claim data using natural language processing to generate a training data set comprising one or more causes and solutions associated with failure of the one or more building devices or the building device components, and train a component reliability model using the training data set to produce a trained model.

Another implementation of the present disclose is a predictive maintenance system comprising a processing circuit including a processor and memory, the memory having instructions stored thereon that, when executed by the processor, cause the processor to receive warranty claim data associated with one or more building devices or building device components, process the warranty claim data using natural language processing to generate a training data set comprising one or more causes and solutions associated with failure of the one or more building devices or the building device components, and train a component reliability model using the training data set to produce a trained model.

BRIEF DESCRIPTION OF THE DRAWINGS

FIG. 7 is a flow diagram illustrating a method for diagnosing chiller component failures using the diagnostic maintenance system of FIG. 6, according to some embodiments.

FIG. 9 is an example warranty claim comment used by the diagnostic maintenance system of FIG. 6 to evaluate a component failure, according to some embodiments.

FIGS. 10A-10D are block diagrams illustrating the results of processing the warranty claim comment to transform the warranty claim comment into a usable data format for the diagnostic maintenance system of FIG. 6, according to some embodiments.

FIG. 13 is an exemplary trigram chart illustrating chiller component failures, derived from a warranty claim data set, and their corresponding solutions, according to some embodiments.

DETAILED DESCRIPTION

Overview

Building equipment, such as HVAC systems/components, play a significant role in the functioning of a building. For example, employers may rely on HVAC equipment such as chillers to maintain a comfortable environment for employees during hot summer months. As another example, a restaurant may rely on a chiller to maintain a suitable environment for storing food ingredients and may suffer a significant loss (e.g., due to spoilage, etc.) if the chiller malfunctions. Moreover, in many scenarios HVAC equipment such as chillers significantly contribute to building energy consumption (e.g., make up half of building energy consumption, etc.). Therefore, it may be desirable to properly maintain HVAC equipment such as chillers to ensure optimal functionality and efficient performance (e.g., to prevent performance degradation due to faulty components and/or incorrect operation, etc.). For example, even temporary downtime of a chiller may lead to substantial financial losses (e.g., due to lost employee productivity, spoilage, knock-on component failures, etc.).

HVAC equipment such as chillers may be equipped with sensors capable of collecting data regarding the functioning of the HVAC equipment. In various embodiments, the data is used to schedule maintenance to prevent downtime associated with HVAC events such as equipment failures (e.g., due to a failed cooling coil, etc.). Predicting equipment failures prior to their occurrence may save time and money. In various embodiments, machine learning and/or statistical models may be used to predict equipment failures. For example, a machine learning and/or statistical model such as a Weibull model and/or a Cox model may be trained using data from sensors monitoring HVAC equipment and may predict equipment failures associated with the HVAC equipment before they occur.

In various embodiments, maintenance data such as a warranty claim comment may be extracted from warranty claim data may be used create a training data set to train a machine learning and/or statistical model. It may be difficult to find the root cause of failures within HVAC equipment and determine appropriate solutions. Instead of purely relying on the experience and expertise of maintenance personnel, the diagnostic system described herein utilizes natural language processing to determine common HVAC component failure and their respective causes and solutions based on evaluating warrant claim comments (e.g., service logs, service comments, etc.) which may submitted by maintenance personnel.

Building and HVAC System

Figure 1:
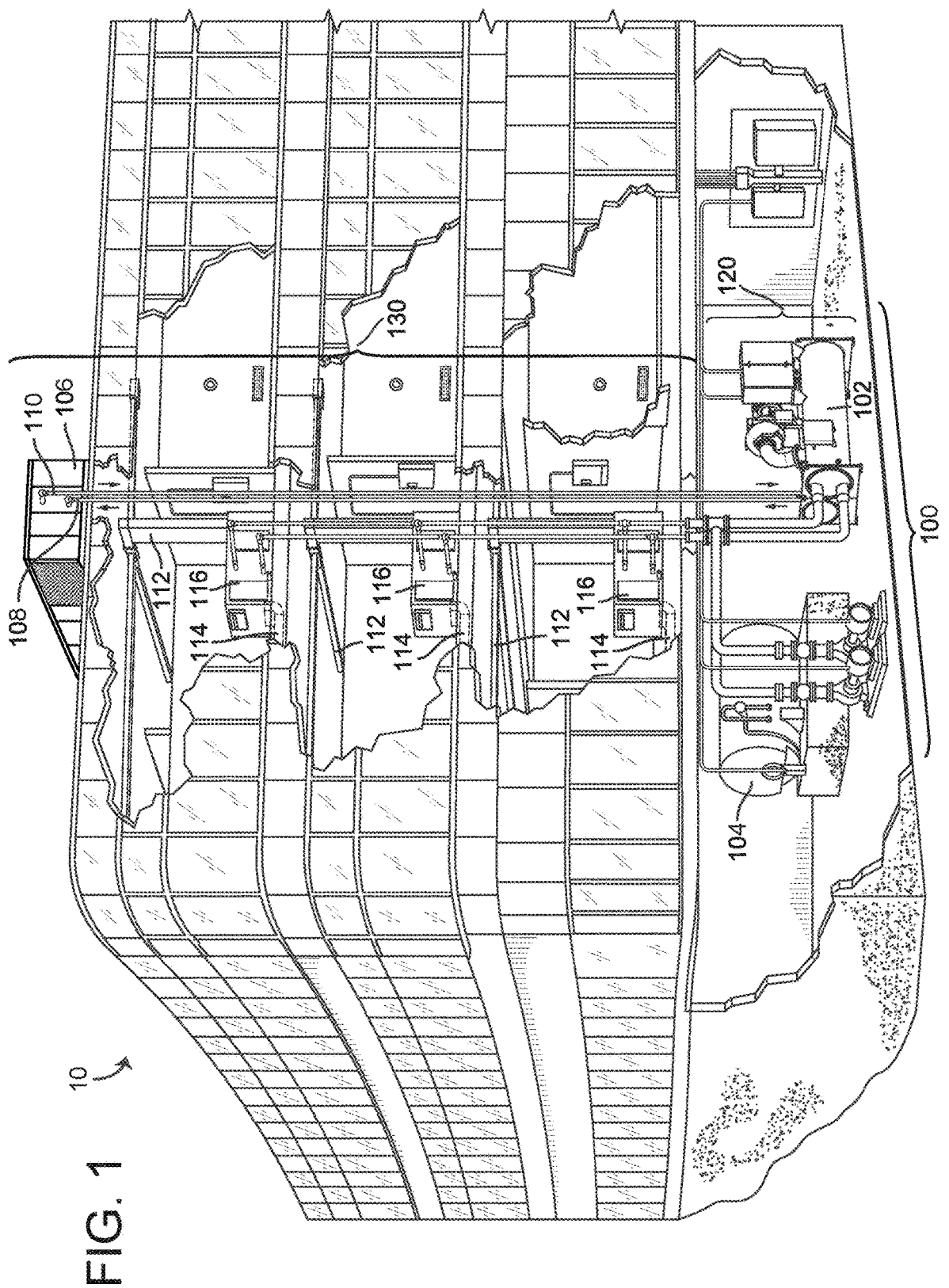
FIG. 1 is a drawing of a building equipped with a HVAC system, according to some embodiments.

Referring now to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
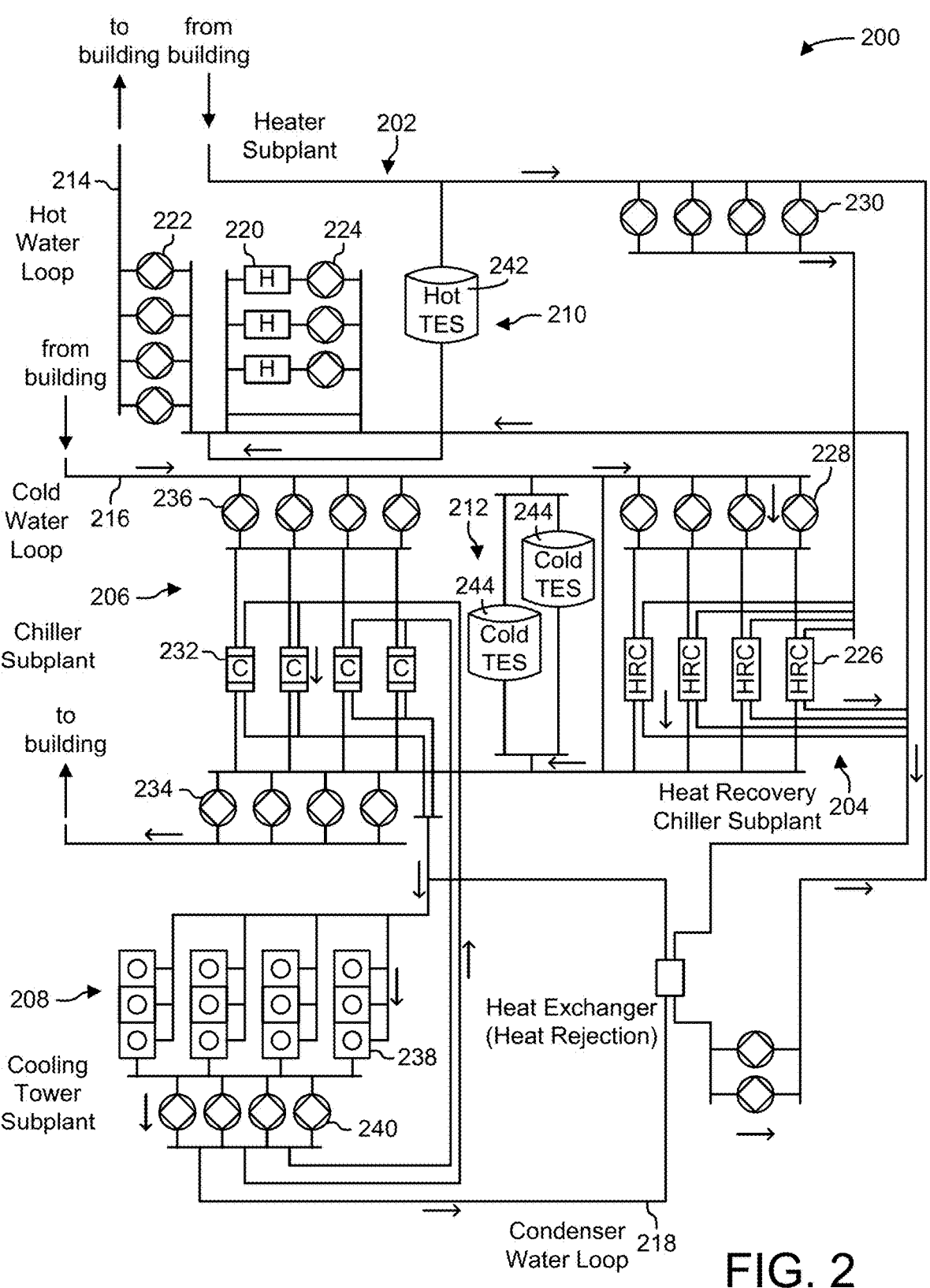
FIG. 2 is a schematic diagram of a waterside system which can be used in conjunction with the building of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
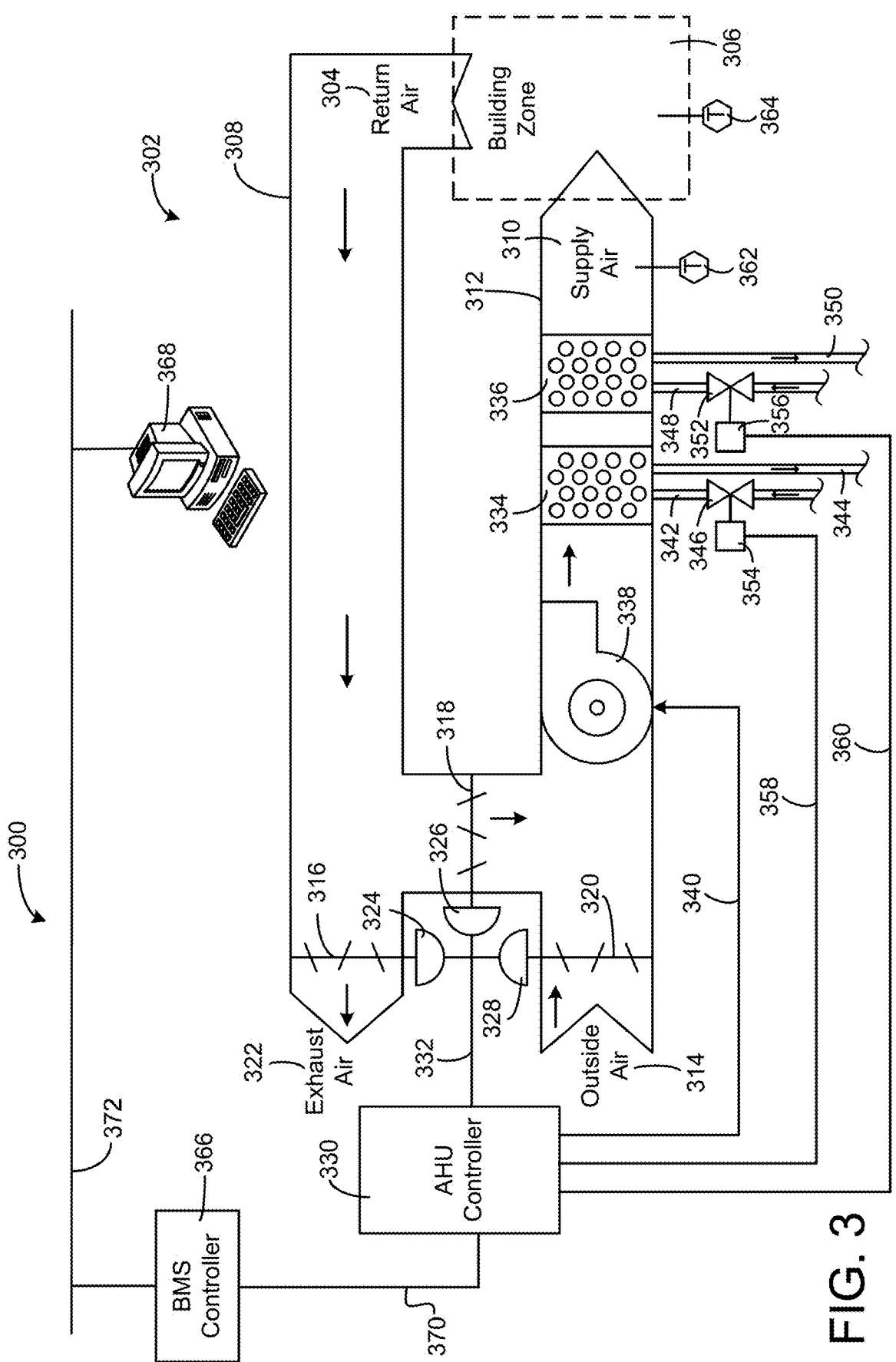
FIG. 3 is a schematic diagram of an airside system which can be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping

348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 4:
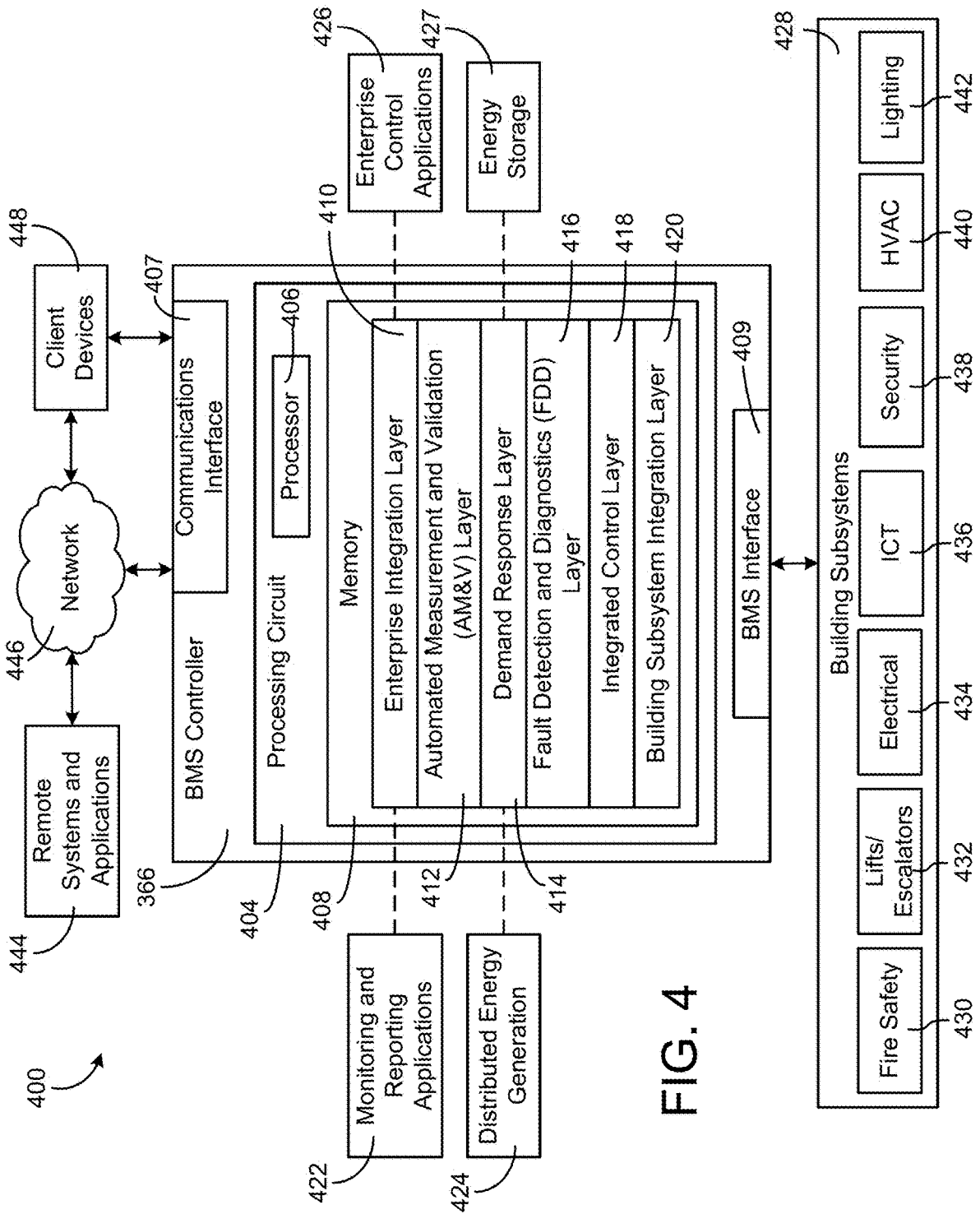
FIG. 4 is a block diagram of a building management system (BMS) which can be used to monitor and control the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
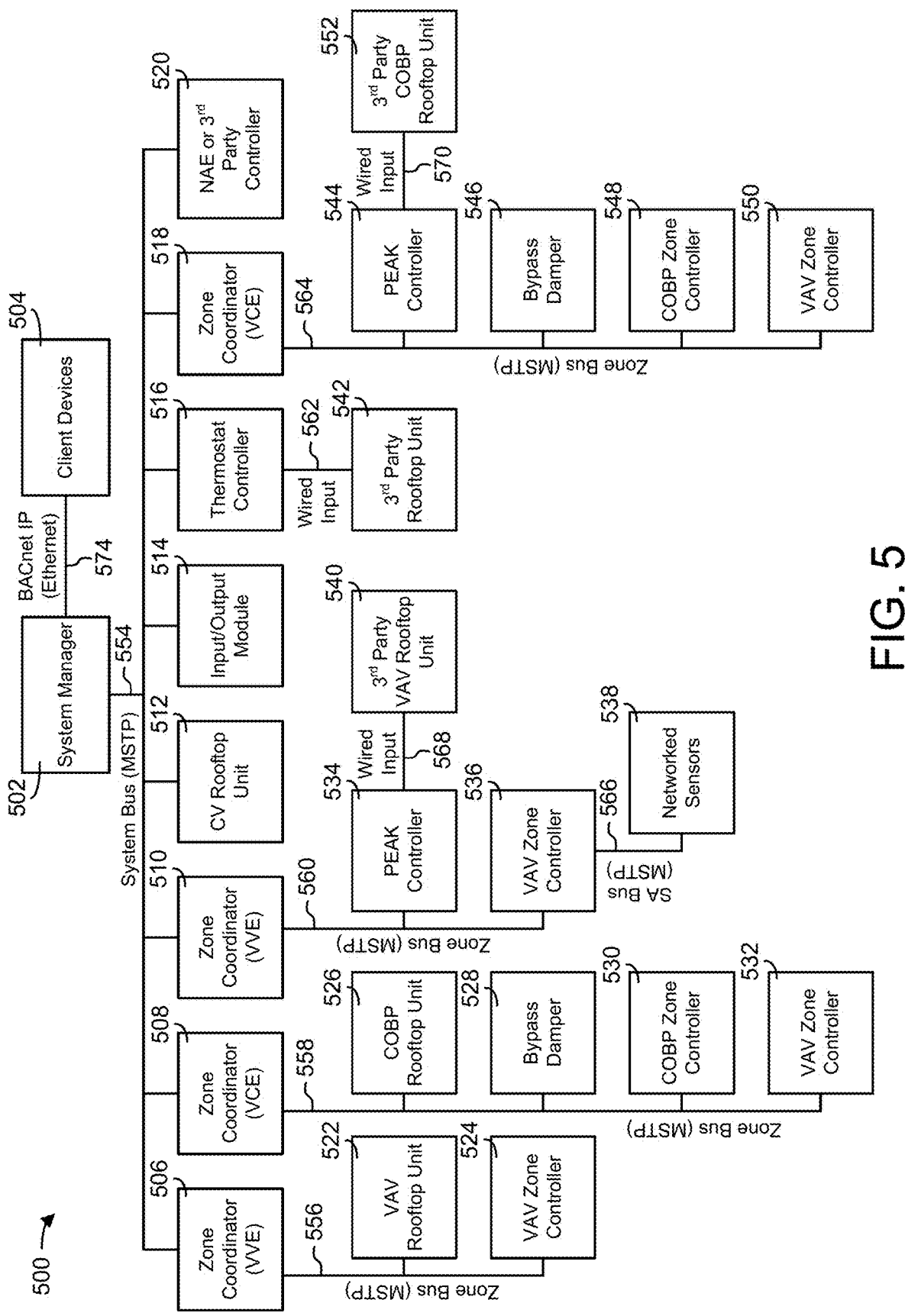
FIG. 5 is a block diagram of another BMS which can be used to monitor and control the building of FIG. 1, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Processing Warranty Claims Using Natural Language Processing

Figure 6:
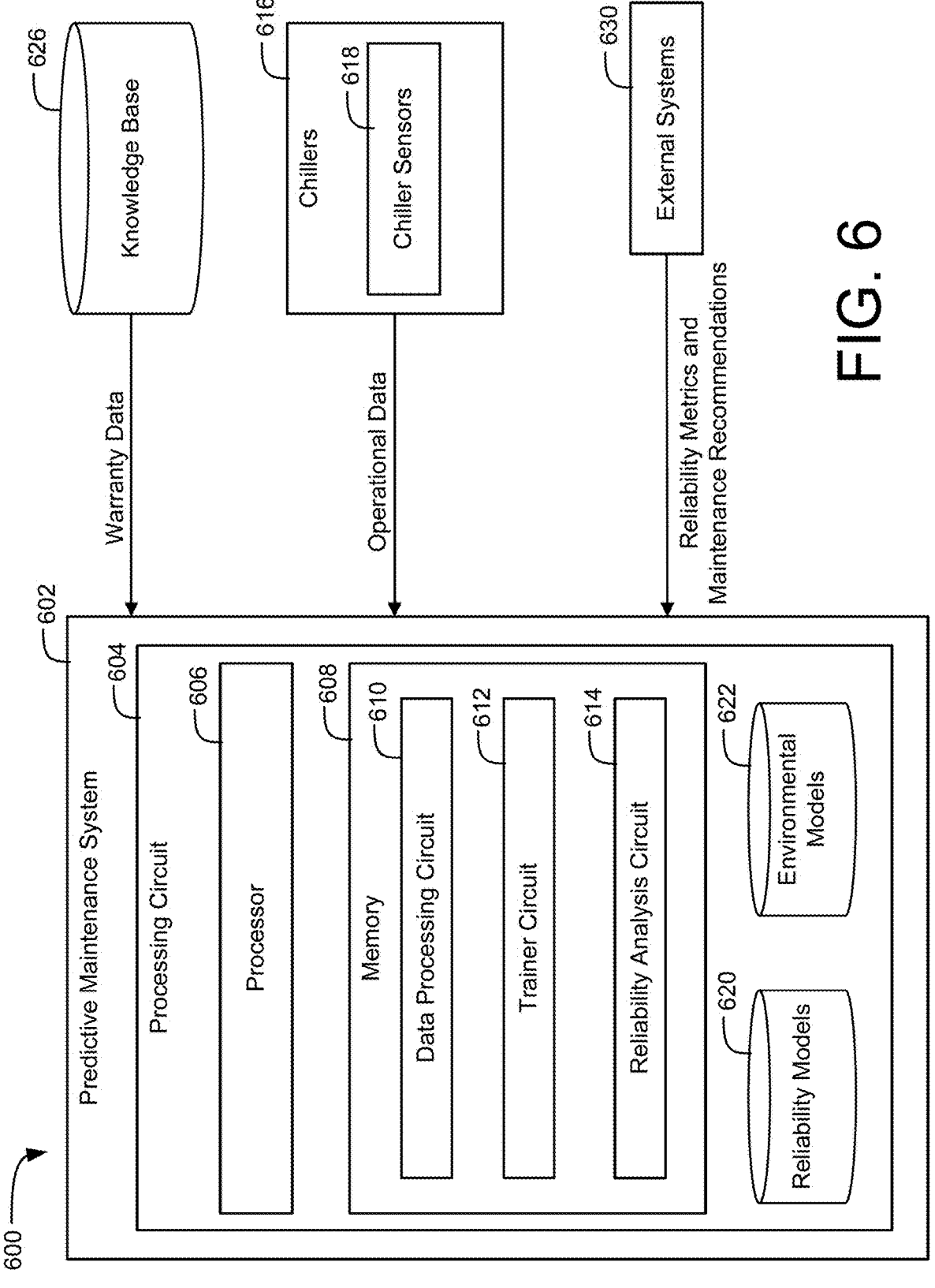
FIG. 6 is a block diagram of a predictive maintenance system for diagnosing component failure causes and solutions, according to some embodiments.

Referring now to FIG. 6, system 600 for diagnosing component failure causes and solutions for building devices/building device components such as HVAC equipment (e.g., chillers, etc.) is shown, according to an exemplary embodiment. In various embodiments, system 600 receives warranty data in the form of warranty claim comments and analyzes and processes the warranty data to create training data sets. The training data sets may be used to run one or more models for managing and maintain building devices/building device components (e.g., predictive models, etc.). System 600 is shown to include predictive maintenance system 602, knowledge base 626, chillers 616, and external systems 630. In some embodiments, components of system 600 communicate via a network (e.g., such as network 446 described above in relation to FIG. 4, etc.). In some embodiments, system 600 includes some or all of the components, subsystems, devices, functionality, and/or other features of any of the systems described in U.S. patent application Ser. No. 17/530,257 filed Nov. 18, 2021, and Singapore Patent Application No. 10202250321D filed Jun. 28, 2022, the entire disclosures of which are incorporated by reference herein.

Predictive maintenance system 602 may be configured to receive warranty data from one or more third party sources, analyze and process the warranty data to determine the potential causes for component failures and proposed solutions for the failures. Predictive maintenance system 602 may include processing circuit 604, reliability models 620, and environmental models 622. Processing circuit 604 may include processor 606 and memory 608. Processor 606 may be implemented as a general purpose processor, an application specific integrated circuit (ASIC), one or more field programmable gate arrays (FPGAs), a group of processing components, or other suitable electronic processing components.

Memory 608 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 608 may be or include volatile memory or non-volatile memory. Memory 608 may include database components, object code components, script components, or any other type of information structure for supporting the various activities and information structures described in the present application. According to some embodiments, memory 608 is communicably connected to processor 606 via processing circuit 604 and includes computer code for executing (e.g., by processing circuit 604 and/or processor 606) one or more operations described herein. Memory 608 may include data processing circuit 610 and reliability analysis circuit 614. Data processing circuit 610 and reliability analysis circuit 614 may be implemented as software (e.g., computer-executable programming code, etc.), hardware (e.g., a logic circuit, etc.), and/or a combination thereof.

Data processing circuit 610 may retrieve warranty data from one or more sources and process and convert the warranty data so that it can be in a format that may be used by one or more machine learning or statistical models. For example, data processing circuit 610 may retrieve warranty claim data from knowledge base 626 and may determine the causes and solutions for failed HVAC components. In some embodiments, data processing circuit 610 retrieves data such as historical operating data from knowledge base 626. Additionally or alternatively, data processing circuit 610 may retrieve data such as operational data from chillers 616.

In various embodiments, data processing circuit 610 may analyze a warranty claim comment from the warranty data received from the knowledge base 626. The warranty claim comment may include information about which components have failed, potential reasons for the component failure, which individuals processed the warranty claims, and any measures taken to address the component failure. For example, referring now to FIG. 9, an example warranty claim comment 900 used by the predictive maintenance system 602 to evaluate a component failure is shown according to an exemplary embodiment. Warranty claim comment 900 includes two parts: the comment heading 902 and the comment narrative 904. The comment heading summarizes the component failure problem (p: Chiller tripping building breaker), cause (C: compressor failure), and solution (S: order compressor and replace). The narrative 904 describes more detail about the component failure.

Figure 8:
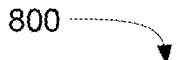
FIG. 8 is a table illustrating the number of chiller components and their corresponding number of warranty claims, according to some embodiments.

In some embodiments, the data processing circuit 610 evaluates a plurality of warranty claim comments to prepare a dataset which describes common problems and solutions for a piece of building equipment. For example, the data processing circuit 610 may evaluate the warranty claim comments from thousands of chillers to create a training dataset which describe common chiller component failures and their respective solution. For example, referring now to FIG. 8, a table 800 illustrating a number of HVAC components and their corresponding number of warranty claims is shown, according to an exemplary embodiment. The table 800 illustrates the scale of how many components and corresponding warranty claims may be evaluated to create the training data set identifying chiller component failures and their corresponding solutions. In some embodiments, the data processing circuit 610 may filter words in the warranty claim comments to transform the warranty claim comment into a format that may be used to create the training data set. For example, the data processing circuit 610 may extract the causes and the solutions from one or more warranty claim comments by identifying key phrases (e.g., "p:", "c:", "5:", etc.) within the warranty claim comments which indicate words that describes potential component failure causes and solutions. As another example, the data processing circuit 610 may further pre-process the warranty claim comment by removing stop words (e.g., "the", "is", "and", etc.) from the warranty claim comments. As another example, the data processing circuit 610 may lemmatize words in the warranty claim comments and remove any additional words that may be repetitive and/or non-useful before sorting the words in the warranty claim comments into language categories (e.g., noun, verb, adjective, etc.). After the warranty claim comments have been filtered using the methods above, the pre-processed warranty claim comments may then be used to generate a training data set with common building component problems and solutions.

Figure 11:
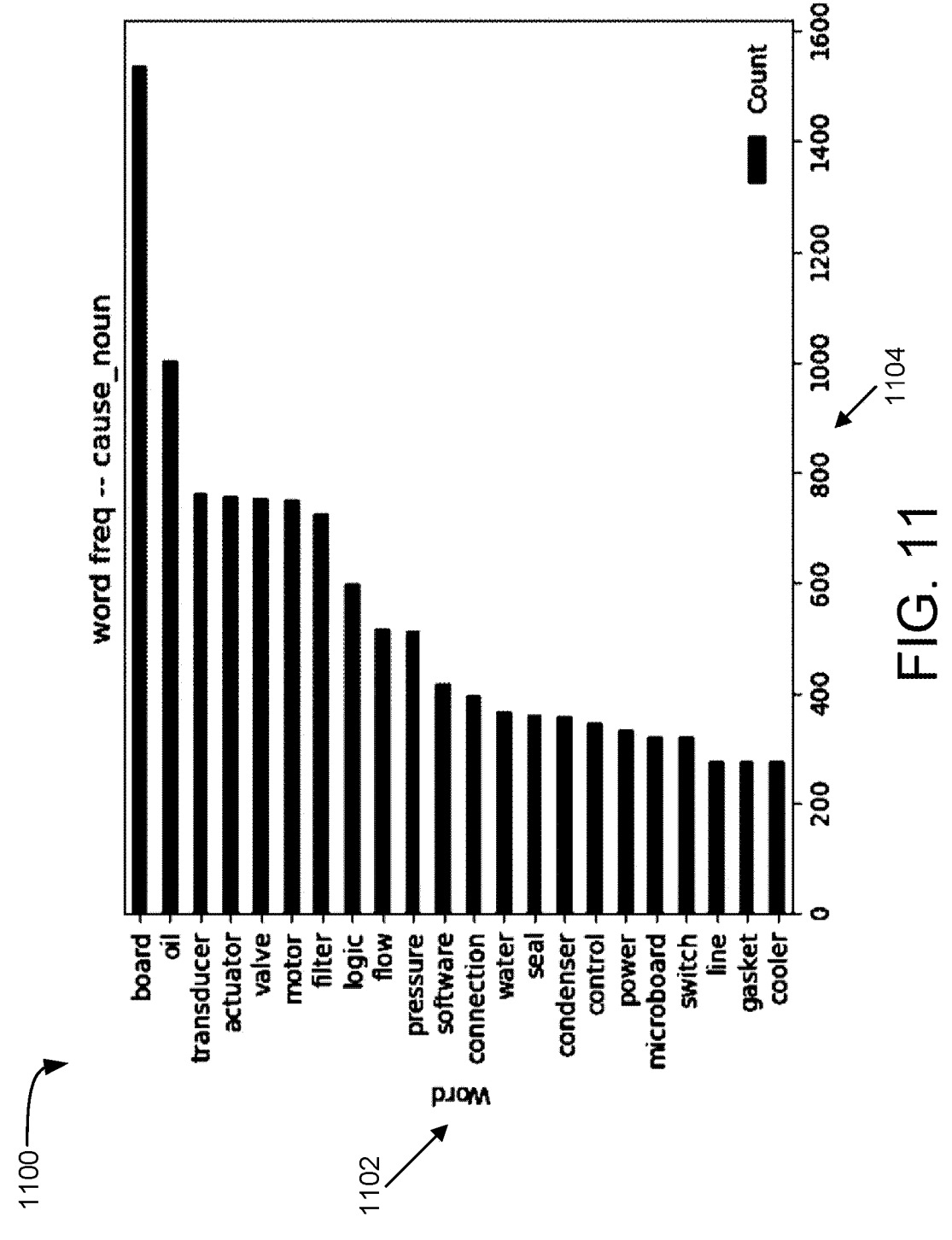
FIG. 11 is a chart illustrating a number of chiller component failure causes evaluated from a plurality of warranty claim data sets, according to some embodiments.

In some embodiments, the data processing circuit 610 may utilize common natural language processing techniques to analyze the warranty claim comments and develop the training data set. In some embodiments, the data processing circuit 610 evaluates the pre-processed warranty claim comments to identify words which frequently show up in the pre-processed warranty claim comments. Specifically, the data processing circuit 610 may identify common nouns within the warranty claim comments to indicate component failure causes. Common nouns that show up frequently in the warranty claim comments may indicate a potential cause for a building component failure. For example, as described herein, the data processing circuit 610 may receive a plurality of warranty claim comments for chillers and their respective components. Common nouns which may indicate the cause of a component failure that are mentioned frequently within the warranty claim comments for chillers may be identified by the data processing circuit 610. For example, referring now to FIG. 11, a chart 1100 illustrating a number of HVAC component failure causes identified from a plurality of warranty claim data sets is shown according to an exemplary embodiment. Chart 1100 includes a vertical axis 1102 which lists the words most frequently found in the warranty claim comments. Chart 1100 includes a horizontal axis 1104 which shows the number of times each of the frequent words show up in the warranty claim comments.

In some embodiments, the data processing circuit 610 checks the independence of each of the common nouns which are identified by the data processing circuit 610. Some of the common nouns may be categorized as independent which means that that noun is not related to any of the other nouns which have been identified as common nouns. An independent word indicates an independent component. Some of the common nouns may be categorized as not independent which means that the noun is related to one or more of the other nous which have been identified as common nouns. For example, the word "board" in chart 1100 which shows up approximately 1500 times is not an independent word because the word "board" may be related to transducer board, an actuator board, or some other type of board related to chillers. Since "board" may relate to multiple components, it is not related to an independent component and thus cannot be categorized as an independent word. On the other hand, the word "oil" is not related to any of the other independent words which have been identified as a common noun and refers to a single independent component. Therefore, the word "oil" is an independent word. Though the example here describes component failure causes, these methods may also be used to identify potential solutions to the component failure.

Figure 12:
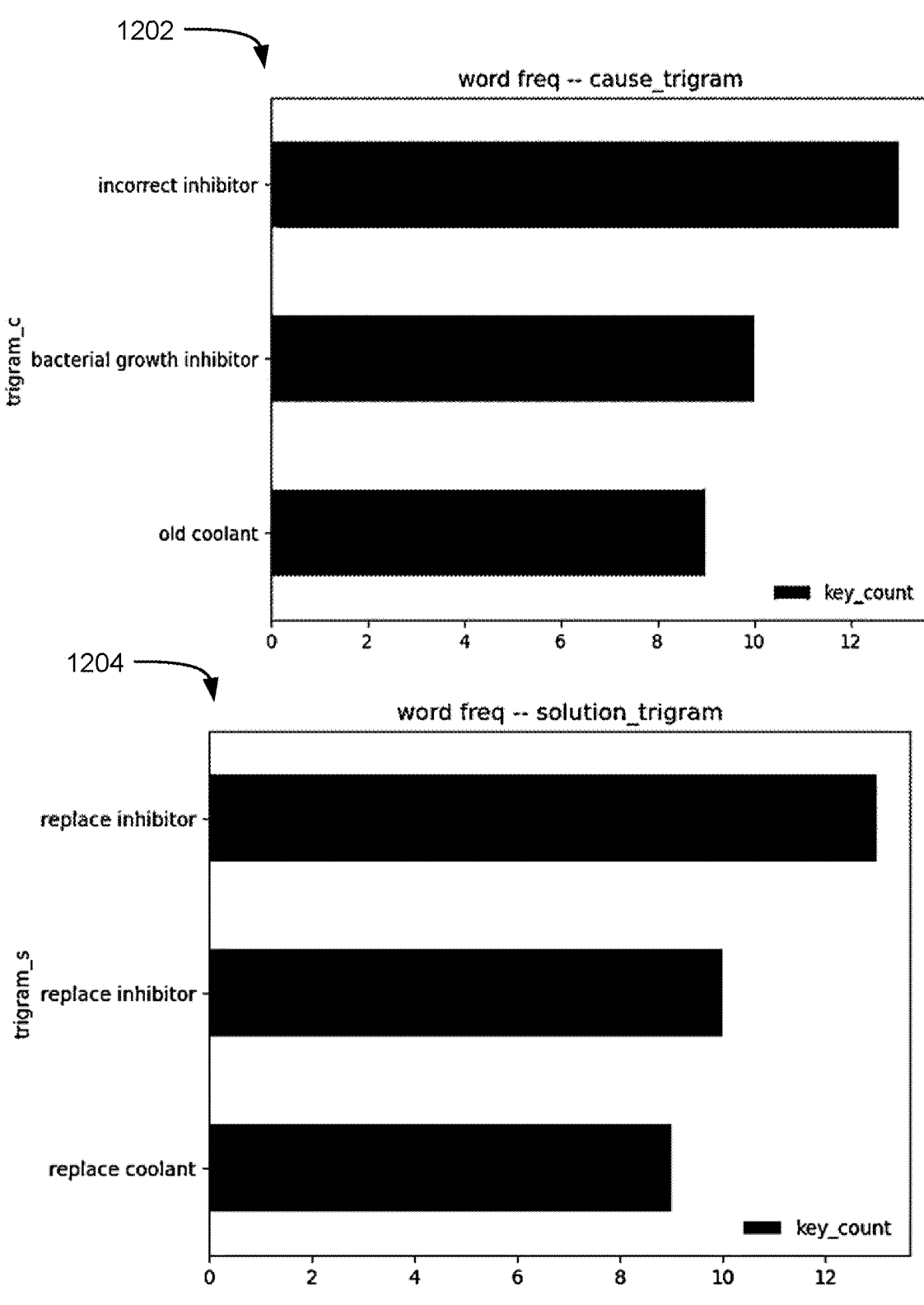
FIG. 12 is a table illustrating the chiller component failure causes and their corresponding solutions based on the warranty claim data sets, according to some embodiments.

In some embodiments, the data processing circuit 610 uses the independent words to create word clusters which are all the instances of each of the independent words clustered together. For example, the words "oil" and "condenser" may be independent. In this case, the data processing circuit 610 may create an "oil" cluster and a "condenser" cluster. The data processing circuit 610 may then use an n-gram to process the data. In the language processing context, and n-gram may be defined as a sequence of consecutive words which may be grouped together to accomplish language processing. For example, bigram and/or trigram natural language processing techniques may be used to evaluate the clusters and find causes and solutions for component failures. For example, the data processing circuit 610 may use a bigram to find the frequency of an adjective which indicates a failed part (e.g., "bad", "defective", "faulty", etc.) associated with the independent word (e.g., "oil") for the cluster. The bigram may be utilized to draw a direct relationship between a cause and a failed building component. As another example, the data processing circuit 610 may use a trigram to find the frequency of an adjective which indicates a failed part associated with the independent word for the cluster (e.g., "oil") and another independent word not related to a cluster (e.g., "condenser". The trigram may be utilized to draw an indirect relationship between a cause and two failed building components. A bigram and trigram may also be used to find solutions for the building component failures. For example, the data processing circuit 610 may use a bigram to find the frequency of a verb which indicates an action taken to fix a building component failure (e.g., a solution) associated with the independent word (e.g., "oil") for the cluster. The bigram may be utilized to draw a direct relationship between a solution and a failed building component. As another example, the data processing circuit 610 may use a trigram to find the frequency of a verb which indicates an action taken to fix a building component failure with the independent word for the cluster (e.g., "oil") and another independent word not related to a cluster (e.g., "condenser". The trigram may be utilized to draw an indirect relationship between a solution and two failed building components. Referring now to FIG. 12, exemplary trigram charts illustrating chiller component failures, derived from a warranty claim data set, and their corresponding solutions is shown, according to some embodiments. Specifically, in the exemplary embodiment shown in FIG. 12, the data processing circuit 610 evaluates a trigram for a cluster with a key word "inhibitor" and non-related word "coolant". FIG. 12 includes a first chart 1202 which demonstrates causes for failure within an inhibitor and a coolant. These causes includes "incorrect inhibitor" (most frequent), "bacterial growth inhibitor" (medium frequency), and "old coolant" (least frequent). FIG. 12 also includes a second chart 1204 which demonstrates solution for failure within the inhibitor and the coolant. These solutions includes "replace inhibitor" (most frequent) and "replace coolant" (least frequent).

The trigrams and bigrams for all the clusters may then be combined to form one data set which describes the top "N" building component failure causes and solutions. For example, referring now to FIG. 13, a table 1300 illustrating the top 21 chiller component failure causes and solutions based on the warranty claim comments is shown according to an exemplary embodiment. In some embodiments, "N" may be a number predetermined by a building manager or building administrator. For example, a building administrator may which to create a training data set with the top 5, 10, 20, 30, etc. chiller component failure causes and solutions. In other embodiments, "N" may be determined by the data processing circuit 610 based on the amount of independent clusters formed. For example, if 11 independent clusters are formed for evaluation, then a data set illustrating the top 11 building component failure causes and solutions may be generated. The data set illustrating the failure causes and solutions may be used as training data set to train one or more models which may be used to control the building.

Trainer circuit 612 may train one or more models using training data set prepared by data processing circuit 610. For example, trainer circuit 612 may train a parametric model such as a Weibull model and/or a semi-parametric model such as a Cox model. In various embodiments, training a Weibull model may include determining a shape parameter and/or a scale parameter. For example, trainer circuit 612 may determine a Weibull distribution based on training data using the function:

$$R(t) = 1 - F(t) = e^{-\left(\frac{t}{\eta}\right)^{\beta}}$$

where $R(t)$ is the reliability function at time $t$, $F(t)$ is the probability of failure at time $t$, $\eta$ is the Weibull scale parameter, and $\beta$ is the Weibull shape parameter. In various embodiments, $0<\beta<1$ corresponds to the infant mortality period, $\beta=1$ corresponds to the normal life period, and $\beta>1$ corresponds to the wear-out period. In some embodiments, trainer circuit 612 trains a machine learning model using a reliability metric from a Weibull model to optimize between a component survival probability, a monetary cost associated with a failure, an operational cost associated with a piece of equipment/component (e.g., from a chiller operating at sub-optimal capacity, etc.), and/or resource constraints. In various embodiments, trainer circuit 612 implements recursive learning by updating a model using feedback.

Reliability analysis circuit 614 may use one or more models trained by trainer circuit 612 to generate reliability metrics and/or maintenance recommendations. For example, reliability analysis circuit 614 may retrieve a shape and a scale parameter from a trained Weibull model and use the shape and scale parameter to determine a MTBF metric. As another example, reliability analysis circuit 614 may use a reliability measure associated with a point in time to determine an optimal maintenance plan based on the survival probability of a component at the point in time, a cost associated with a failure of the component, an operational cost of the component, and/or any resource constraints that may exist. In some embodiments, reliability analysis circuit 614 implements the function:

$$\min \sum_{t \in T} \left( \sum_{i \in I} \alpha_{it} P_{it} + \sum_{j \in J} \beta_j X_{jt} \right)$$

$$\text{s.t. } \sum_{j \in J} \beta_j X_{jt} \leq \overline{\beta}_t, \, t \in T$$

$$\sum_{j \in J} \gamma_j X_{jt} \leq \overline{\gamma}_t, \, t \in T$$

In some embodiments, reliability analysis circuit 614 implements the function:

$$f(t) = \frac{dF(t)}{dt} = \frac{\beta}{\eta^\beta} t^{\beta-1} e^{-\left(\frac{t}{\eta}\right)^\beta}$$

where f(t) is the probability density function (PDF) of failure at time t. Additionally or alternatively, reliability analysis circuit 614 may implement the function:

$$h(t) = \frac{f(t)}{R(t)} = \frac{\beta}{\eta^\beta} t^{\beta-1}$$

where h(t) is the hazard rate function for the instantaneous conditional probability of failure at time t. In some embodiments, reliability analysis circuit 614 determines a MTBF as:

$$MTBF = \eta \Gamma\left(\frac{1}{\beta} + 1\right)$$

where Γ is:

$$\Gamma(z) = \int_0^\infty t^{z-1} e^{-t} dt, \, \Re(z) > 0$$

where z is a complex number. In some embodiments, reliability analysis circuit 614 determines time to X % failure as:

$$B(X) = \eta(-\log\left(1 - \frac{X}{100}\right)^{\frac{1}{\beta}})$$

where X is a percentage failure (e.g., a likelihood of failure, etc.)

In various embodiments, reliability models 620 include a database storing one or more trained models generated by trainer circuit 612. For example, reliability models 620 may include a number of trained machine learning models (e.g., weights associated with nodes of a neural network, etc.) generated by trainer circuit 612. As another example, reliability models 620 may include a number of shape and scale parameters corresponding to different trained Weibull models. In some embodiments, different models are used for different pieces of equipment/components. For example, reliability models 620 may include a first model for generating reliability metrics associated with a first component (e.g., a cooling coil, etc.) and may include a second model for generating reliability metrics associated with a second component (e.g., a bracket, etc.). In various embodiments, reliability models 620 may include models associated with individual components, pieces of equipment (e.g., a chiller, an access control device, a security camera, a fire suppression device, etc.) and/or a cluster of equipment/components (e.g., all chillers produced from a certain manufacturing location, all chillers produced in a certain year, all building controllers having a specific firmware version, etc.).

In various embodiments, reliability models 620 include a database storing one or more trained models generated by trainer circuit 612. For example, reliability models 620 may include a number of trained machine learning models (e.g., weights associated with nodes of a neural network, etc.) generated by trainer circuit 612. As another example, reliability models 620 may include a number of shape and scale parameters corresponding to different trained Weibull models. In some embodiments, different models are used for different pieces of equipment/components. For example, reliability models 620 may include a first model for generating reliability metrics associated with a first component (e.g., a cooling coil, etc.) and may include a second model for generating reliability metrics associated with a second component (e.g., a bracket, etc.). In various embodiments, reliability models 620 may include models associated with individual components, pieces of equipment (e.g., a chiller, an access control device, a security camera, a fire suppression device, etc.) and/or a cluster of equipment/components (e.g., all chillers produced from a certain manufacturing location, all chillers produced in a certain year, all building controllers having a specific firmware version, etc.).

Environmental models 622 may include a database storing climate data for calibrating runtimes associated with HVAC equipment. For example, environmental models 622 may include a table listing idle calibration offsets associated with various geographic regions to facilitate calibrating a runtime associated with a chiller. In various embodiments, environmental models 622 include historical data. For example, environmental models 622 may include a climate model including daily temperatures for an area over a five-year period. In some embodiments, predictive maintenance system 602 determines climate data based on operational data received from chillers 616. For example, predictive maintenance system 602 may receive control signals from chillers 616 indicating when chillers 616 are operating and/or contextual data (e.g., at what load chillers 616 are running, what an indoor temperature setpoint is, what the outdoor air temperature is, etc.) and may store the information in environmental models 622 based on the geography of chillers 616.

Knowledge base 626 may be a database storing data associated with HVAC equipment such as chillers. For example, knowledge base 626 may include warranty claim data describing (i) an equipment/component identifier, (ii) a ship date (e.g., a date a piece of equipment/component was shipped to an install location, etc.), (iii) a failure date (e.g., a date a piece of equipment/component failed, etc.), (iv) a runtime associated with the equipment/component (e.g., runtime may be equal to the subtraction of the start date from the failure date), (v) a start date (e.g., a date the piece of equipment/component began operating at the install location, etc.), (vi) a manufacturing location identifier, (vii) a product description, (viii) warranty claim comments, and/or (viii) a location identifier associated with the install location (e.g., an address, etc.). In some embodiments, knowledge base 626 includes service history data (e.g., a record of maintenance performed on a piece of equipment/component, etc.). It should be understood that while knowledge base 626 is described in relation to including warranty claim data, knowledge base 626 may store any data from which a runtime associated with a piece of equipment/component may be calculated and that the present disclosure is not limited to computations based on warranty claim data. For example, knowledge base 626 may include fault data associated with a number of building devices (e.g., lighting controllers, thermostats, access control devices, etc.). In various embodiments, knowledge base 626 is or includes a digital twin database such as a knowledge graph. For example, knowledge base 626 may include a graph data structure having nodes representing building devices and/or building device components and edges connecting the nodes representing relationships between the building devices and/or building device components.

Chillers 616 may be one or multiple chillers, e.g., chiller 102 as described with reference to FIG. 1. Chiller sensors 618 can be positioned on, within, and/or adjacent to chillers 616, according to some embodiments. Further, chiller sensors 618 can be configured to collect a variety of data including usage time, efficiency metrics, input and output quantities, as well as other data. According to some embodiments, chiller sensors 618 can be configured to store and/or communicate collected chiller data. In some embodiments, chillers 616 can also be configured to store and/or communicate collected chiller data from chiller sensors 618. Predictive maintenance system 602 may receive performance data from chillers 616 and generate equipment/component reliability models for the chillers and utilize the models to determine the likelihood of a failure occurring in the future for chillers 616. Predictive maintenance system 602 may not be limited to performing failure predictions for chillers and can also be configured to perform failure prediction for other types of building equipment (e.g., air handler unit 106 as described with reference to FIG. 1, boiler 104 as described with reference to FIG. 1, etc.).

External systems 630 may communicate with predictive maintenance system 602. For example, external systems 630 may include client devices (e.g., such as client devices 448, etc.) used by building maintenance personnel and may receive maintenance recommendations from predictive maintenance system 602. As another example, external systems 630 may include a weather reporting system which may communicate historical climate data to predictive maintenance system 602 to facilitate calibrating runtime estimates associated with chillers. As yet another example, external systems 630 may include building controllers (e.g., BMS controller 366, etc.) and/or remote systems such as a work order management system (e.g., remote systems and applications 444, etc.) that receive reliability metrics and/or work order requests from predictive maintenance system 602 to facilitate automated work order requests and/or part ordering.

Referring now to FIG. 7, a flow diagram illustrating method 700 for diagnosing chiller component failures to determine chiller failure causes and solutions is shown, according to an exemplary embodiment. In various embodiments, method 700 is performed by predictive maintenance system 602. For example, predictive maintenance system

602 may receive warranty claim data from the knowledge base 626 and may perform method 700 to evaluate and process the received warranty claim data to create a data set which illustrates the causes and solutions for building component failures. In some embodiments, the data set may be used to train a machine learning model and generate reliability metrics for building components.

At step 702, the predictive maintenance system 602 may receive warranty claim data from one or more building components (e.g., chillers and/or chiller components, etc.). Specifically, the predictive maintenance system 602 may receive warranty claim data from knowledge base 626. In some embodiments, the warranty claim data may include warranty claim comments which describes information related to failed building components. For example, if a building component (e.g., chillers and/or chiller components, etc.) fails, then maintenance personnel may be contacted to resolve the problem as a part of the warranty agreement. The maintenance personal may submit a warranty claim comment describing the component failure. An exemplary warranty claim comment that may be submitted is described above with respect to FIG. 9.

Figure 10D:
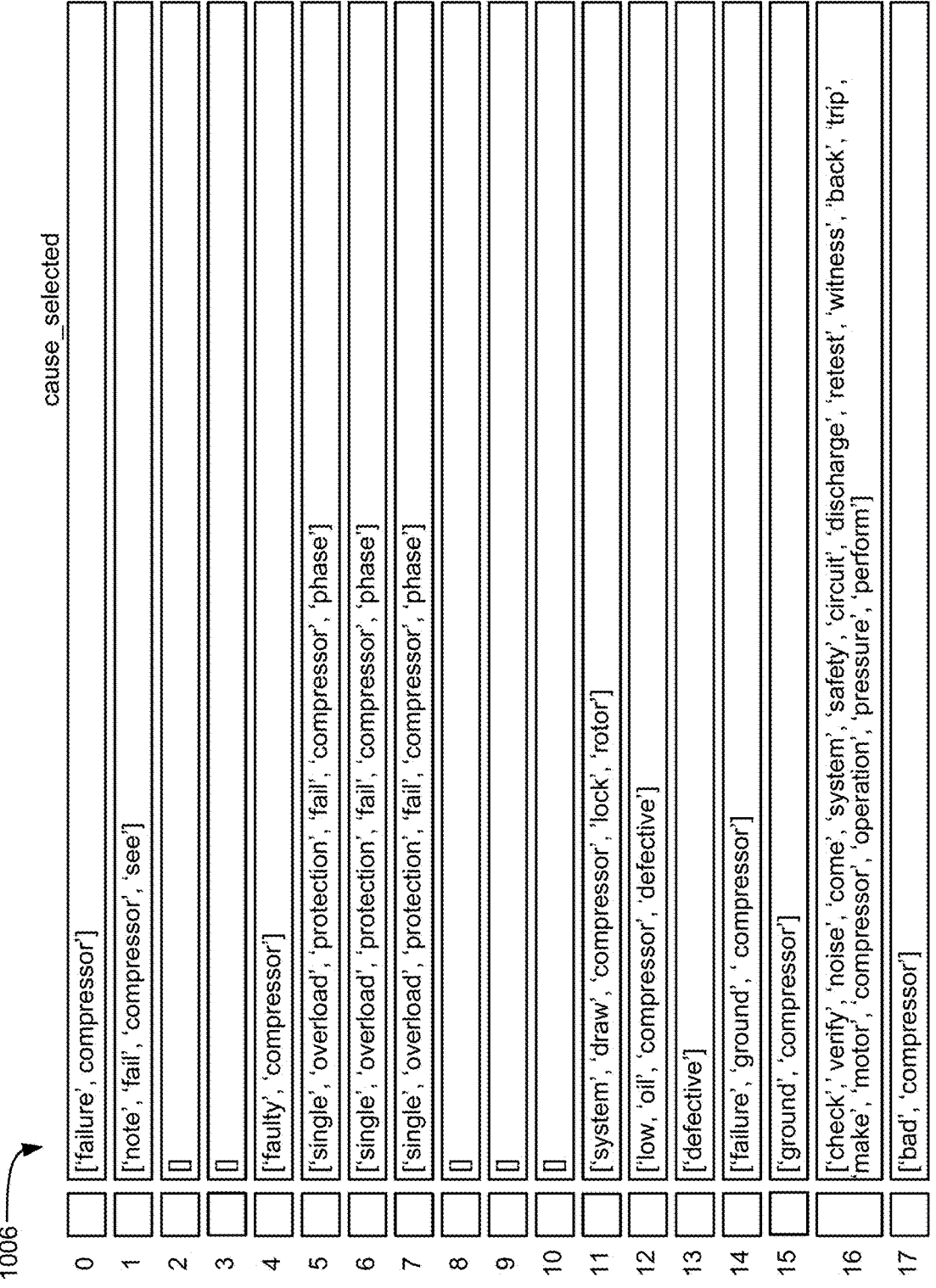

At step 704, the predictive maintenance system 602 may pre-process warranty claim data to filter out unnecessary information and identify key words. Specifically, the predictive maintenance system 602 may filter words in the warranty claim comments to transform the warranty claim comment into a format that may be used to create the training data set. For example, the predictive maintenance system 602 may extract the causes and the solutions from one or more warranty claim comments by identifying key phrases (e.g., ":p", ":c", ":s", etc.) within the warranty claim comments which indicate words that describes potential component failure causes and solutions in a first processing technique. For example, referring now to FIG. 10A, a table 1000 illustrating a data set derived based on a warranty claim comment after the being transformed by the first processing technique is shown, according to an exemplary embodiment. Specifically, table 1000 illustrates identifying the key phrase ":c" which indicates that the cause of the failure for the building component (e.g., compressor failure).

As another example, the predictive maintenance system 602 may further pre-process the warranty claim comment by removing stop words (e.g., "the", "is", "and", etc.) from the warranty claim comments in a second pre-processing technique. For example, referring now to FIG. 10B, a table 1002 illustrating a data set derived based on a warranty claim comment after being transformed by the second pre-processing technique is shown according to an exemplary embodiment. Specifically, the table 1002 illustrates removing the stop words from the warranty claim comment which was partially pre-processed using the first pre-processing technique as described above with respect to FIG. 10A.

As another example, the predictive maintenance system 602 may lemmatize words in the warranty claim comments in a third pre-processing technique. For example, referring now to FIG. 10C, a table 1004 illustrating a data set derived based on a warranty claim comment after being transformed by the third pre-processing technique is shown, according to an exemplary embodiment. Specifically, the table 1004 illustrates lemmatizing words from the warranty claim comment which was partially pre-processed using the second pre-processing technique as described above with respect to FIG. 10B. As another example, the predictive maintenance system 602 may remove any additional words that may be repetitive and/or non-useful before sorting the words in the warranty claim comments into language categories (e.g., noun, verb, adjective, etc.) in a fourth pre-processing technique. For example, referring now to FIG. 10D, a table 1006 illustrating a data set derived based on a warranty claim comment after being transformed by the fourth pre-processing technique is shown, according to an exemplary embodiment. Specifically, the table 1006 illustrates removing any additional words that may be repetitive from the warranty claim comment which was partially pre-processed using the third pre-processing technique as described above with respect to FIG. 10C. After the warranty claim comments have been filtered using the methods above, the pre-processed warranty claim comments may then be used to generate a training data set with common building component problems and solutions. It should be noted that any combination of the above mentioned pre-processing techniques may be applied to the warranty claim comments. For example, in some embodiments, all the pre-processing techniques may be used while in other embodiments, only a portion of the pre-processing techniques may be used.

At step 706, the predictive maintenance system 602 evaluates the pre-processed warranty claim data using natural language processing techniques to create a data set which describes building component failure causes and solutions. In some embodiments, the data set which describes building component failure causes and solutions may be used a training data set for one or more models as will be described in more detail below. In some embodiments, the predictive maintenance system 602 evaluates the pre-processed warranty claim comments to identify words which frequently show up in the pre-processed warranty claim comments. Specifically, the predictive maintenance system 602 may identify common nouns within the warranty claim comments to indicate component failure causes. Common nouns that show up frequently in the warranty claim comments may indicate a potential cause for a building component failure. For example, the predictive maintenance system 602 may receive a plurality of warranty claim comments for chillers and their respective components. Common nouns which may indicate the cause of a component failure that are mentioned frequently within the warranty claim comments for chillers may be identified by the diagnostic maintenance system.

After identifying the common nouns, the predictive maintenance system 602 then checks the independence of each of the common nouns which were identified. Some of the common nouns may be categorized as independent which means that that noun is not related to any of the other nouns which have been identified as common nouns. An independent word indicates an independent component. Some of the common nouns may be categorized as not independent which means that the noun is related to one or more of the other nous which have been identified as common nouns. The independent words may then be used to create word clusters which are all the instances of each of the independent words clustered together. Then, the predictive maintenance system 602 may use a bigram and/or trigram to evaluate the clusters and find causes and solutions for component failures. The bigram may be utilized to draw a direct relationship between a cause and/or solution and a failed building component. The trigram may be utilized to draw an indirect relationship between a cause and/or solution and two failed building components.

At step 708, the predictive maintenance system 602 generates a training data set describing building component failure causes and solutions based on the warranty claim data. Specifically, the predictive maintenance system 602 may combine the trigrams and bigrams for all the clusters to form one data set which describes the top "N" building component failure causes and solutions. In some embodiments, the data set which describes the top "N" building component failure causes and solutions may be a training data set.

At step 710, the predictive maintenance system 602 trains one or more models using the training data. For example, the predictive maintenance system 602 may train a parametric model such as a Weibull model for each component of a chiller. As another example, the predictive maintenance system 602 may train a semi-parametric model such as a Cox model for a cluster of chillers manufactured at a particular location during a particular time period. Training the one or more models may include generating a Weibull distribution using the training data.

At step 712, the predictive maintenance system 602 generates one or more reliability metrics based on the one or more model trained above at step 710. In various embodiments, step 712 includes determining a Weibull shape and/or scale parameter based on a Weibull distribution. Additionally or alternatively, predictive maintenance system 602 may calculate additional reliability descriptions such as a MTBF, time to X % failure, CDF, reliability function, PDF, and/or HRF.

At step 714, the predictive maintenance system 602 updates the one or more building component based on the one or more reliability metrics. For example, if a reliability metric for a building software component indicates that the version of the software is out of date, the predictive maintenance system 602 may automatically update the software. As another example, if the reliability metric for a building hardware component indicates that the hardware component needs to be replaced, the predictive maintenance system 602 may automatically transmit a notification to a physical device associated with building maintenance personal indicating that maintenance is required for that particular building component.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain operation or group of operations.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A method for generating a reliability model for one or more building devices or building device components, the method comprising:

receiving, by a processing circuit, warranty claim data associated with the one or more building devices or the building device components;

processing, by the processing circuit, the warranty claim data using natural language processing to generate a training data set by:

generating a plurality of clusters of warranty claims, each cluster based on a noun representing one of the building device components identified in the warranty claim as part of both one or more causes and one or more solutions associated with failure of the one or more building devices or the building device components; and selecting, for the training set, a most frequent cause and solution of the one or more causes and the one or more solutions from a quantity of the plurality of clusters;

training, by the processing circuit, a component reliability model using the training data set to produce a trained model, wherein training the component reliability model comprises configuring the component reliability model to output a reliability metric related to the one or more causes by adjusting parameters of the component reliability model; and in response to predicting a failure of a building device or component of the one or more building devices or building device components using the component reliability model, at least one of:

generating, by the processing circuit, electronic control signals for communicating a shutdown command to the building device or component and transmitting, by the processing circuit, the electronic control signals to the building device or component, causing the building device or component to cease current operations; or generating, by the processing circuit, electronic control signals for communicating operations based on the current operations of the building device or component to an alternative building device or component and transmitting, by the processing circuit, the electronic control signals to the alternative building device or component, causing the alternative building device or component to perform the operations.

2. The method of claim 1, wherein the warranty claim data includes a warranty claim comment, wherein processing the warranty claim data comprises at least one of identifying key words in the warranty claim comment, removing a stop word in the warranty claim comment, lemmatizing words in the warranty claim comment, or removing unnecessary words from the warranty claim comment.

3. The method of claim 1, wherein evaluating the processed warranty claim data using natural language processing comprises:

identifying, by the processing circuit, a plurality of words which occur in the warranty claim data over a predetermined amount of time;

determining, by the processing circuit, that the plurality of words are independent from each other;

creating, by the processing circuit, a plurality of word clusters associated with each of the plurality of words that are independent from each other; and generating, by the processing circuit, a plurality of n-grams for the plurality of word clusters to determine the one or more causes and the one or more solutions associated with the failure of the one or more building devices or the building device components.

4. The method of claim 3, wherein generating the training data set based on the one or more causes and the one or more solutions further comprises combining, by the processing circuit, the plurality of n-grams to form the training data set which describes a predetermined number of building component failure causes and solutions.

5. The method of claim 1, further comprising:

generating, by the processing circuit, the reliability metric describing a predicted failure time associated with the one or more building devices or the building device components based on the trained model; and updating, by the processing circuit, the building device components based on the reliability metric.

6. The method of claim 5, wherein updating the building device components comprises automatically updating software for the building device components.

7. The method of claim 1, wherein training the component reliability model to produce the trained model includes determining a shape parameter and a scale parameter of a Weibull model.

8. The method of claim 1, wherein processing the warranty claim data includes filtering out unnecessary information and identifying key words.

9. One or more non-transitory computer-readable storage media having instructions stored thereon that, when executed by one or more processors, cause the one or more processors to:

receive warranty claim data associated with one or more building devices or building device components;

process the warranty claim data using natural language processing to generate a training data set by:

generating a plurality of clusters of warranty claims, each cluster based on a noun representing one of the building device components identified in the warranty claim as part of both one or more causes and one or more solutions associated with failure of the one or more building devices or the building device components; and selecting, for the training set, a most frequent cause and solution of the one or more causes and the one or more solutions from a quantity of the plurality of clusters;

train a component reliability model using the training data set to produce a trained model, wherein training the component reliability model comprises configuring the component reliability model to output a reliability metric related to the one or more causes by adjusting parameters of the component reliability model; and in response to predicting a failure of a building device or component of the one or more building devices or building device components using the component reliability model, at least one of:

generate electronic signals for communicating (i) an identification of the building device or component to a work order management system and (ii) a command to generate an automated work order request over a network and transmit the electronic signals on the network to the work order management system, causing the work order management system to generate the automated work order request including the identification of the building device or component; or generate electronic signals for communicating (i) an identification of a part of the building device or component to a part ordering system or parts supplier system and (ii) a request to order the part for the building device or component to generate to the part ordering system or the parts supplier system and transmit the electronic signals on the network to the part ordering system or the parts supplier system, causing the part to be ordered.

10. The one or more non-transitory computer-readable storage media of claim 9, wherein the warranty claim data includes a warranty claim comment.

11. The one or more non-transitory computer-readable storage media of claim 10, wherein processing the warranty claim data comprises at least one of identifying key words in the warranty claim comment, removing a stop word in the warranty claim comment, lemmatizing words in the warranty claim comment, or removing unnecessary words from the warranty claim comment.

12. The one or more non-transitory computer-readable storage media of claim 9, wherein evaluating the processed warranty claim data using the natural language processing comprises:

identifying a plurality of words which occur in the warranty claim data over a predetermined amount of time;

determining that the plurality of words are independent from each other;

creating a plurality of word clusters associated with each of the plurality of words that are independent from each other; and generating a plurality of n-grams for the plurality of word clusters to determine the one or more causes and the one or more solutions associated with the failure of the one or more building devices or the building device components.

13. The one or more non-transitory computer-readable storage media of claim 12, wherein generating the training data set based on the one or more causes and the one or more solutions further comprises combining the plurality of n-grams to form the training data set which describes a predetermined number of building component failure causes and solutions.

14. The one or more non-transitory computer-readable storage media of claim 9, wherein the instructions further cause the one or more processors to:

generate the reliability metric describing a predicted failure time associated with the one or more building devices or the building device components based on the trained model; and update the building device components based on the reliability metric.

15. The one or more non-transitory computer-readable storage media of claim 14, wherein updating the building device components comprises automatically updating a software for the building device components.

16. The one or more non-transitory computer-readable storage media of claim 14, wherein training the component reliability model to produce the trained model includes determining a shape parameter and a scale parameter of a Weibull model.

17. A predictive maintenance system, comprising:

a processing circuit including a processor and memory, the memory having instructions stored thereon that, when executed by the processor, cause the processor to:

receive warranty claim data associated with one or more building devices or building device components;

process the warranty claim data using natural language processing to generate a training data set by:

generating a plurality of clusters of warranty claims, each cluster based on a noun representing one of the building device components identified in the warranty claim as part of both one or more causes and one or more solutions associated with failure of the one or more building devices or the building device components; and selecting, for the training set, a most frequent cause and solution of the one or more causes and the one or more solutions from a quantity of the plurality of clusters;

train a component reliability model using the training data set to produce a trained model, wherein training the component reliability model comprises configuring the component reliability model to output a reliability metric related to the one or more causes by adjusting parameters of the component reliability model; and in response to predicting a failure of a building device or component of the one or more building devices or building device components using the component reliability model:

generate electronic control signals for communicating a command to update a software version of the building device or component; and transmit the electronic control signals to the building device or component, causing the building device or component to initiate an update of the software version.

18. The predictive maintenance system of claim 17, wherein the warranty claim data includes a warranty claim comment.

19. The predictive maintenance system of claim 18, wherein processing the warranty claim data comprises at least one of identifying key words in the warranty claim comment, removing a stop word in the warranty claim comment, lemmatizing words in the warranty claim comment, or removing unnecessary words from the warranty claim comment.

20. The predictive maintenance system of claim 17, wherein the instructions further cause the processor to:

generate the reliability metric describing a predicted failure time associated with the one or more building devices or the building device components based on the trained model; and update the building device components based on the reliability metric.

* * * * *